United States Patent [19]
Eller et al.

[11] Patent Number: 6,001,243
[45] Date of Patent: Dec. 14, 1999

[54] HEATING AND REACTION SYSTEM AND METHOD USING RECYCLE REACTOR

[75] Inventors: James M. Eller; Roy N. McBrayer, Jr., both of Austin; Richard D. Peacock; John S. Barber, both of Round Rock; Walter H. Stanton, Tyler; Fred Applegath, Texas City; Gordon H. Lovett, deceased, late of Kerrville, all of Tex., by Margaret O. Lovett, executrix

[73] Assignee: Chematur Engineering AB, Karlskoga, Sweden

[21] Appl. No.: 09/133,557

[22] Filed: Aug. 13, 1998

Related U.S. Application Data

[62] Division of application No. 08/657,899, Jun. 7, 1996.

[51] Int. Cl.[6] .................................................. C02F 1/72
[52] U.S. Cl. ..................... 210/96.1; 210/105; 210/143; 210/149; 210/181; 210/194; 210/195.1; 210/199; 210/202; 210/205; 422/109; 422/111; 422/234
[58] Field of Search ................................ 210/96.1, 143, 210/149, 194, 195.1, 199, 202, 205, 105, 181; 422/234, 235, 109, 111

[56] References Cited

U.S. PATENT DOCUMENTS

| | | |
|---|---|---|
| 1,725,782 | 8/1929 | Florez . |
| 1,986,196 | 1/1935 | Grosse . |
| 1,988,456 | 1/1935 | Lysholm . |
| 2,398,546 | 4/1946 | Messmore . |
| 2,476,598 | 7/1949 | Hall et al. . |
| 2,519,616 | 8/1950 | Watkins . |
| 2,545,384 | 3/1951 | Rehrig . |
| 2,647,368 | 8/1953 | Triebbnigg et al. . |
| 2,665,249 | 1/1954 | Zimmerman . |
| 2,692,800 | 10/1954 | Nichols et al. . |
| 2,697,910 | 12/1954 | Brzozowski . |
| 2,735,265 | 2/1956 | du Bois Eastman . |

(List continued on next page.)

FOREIGN PATENT DOCUMENTS

| | | |
|---|---|---|
| 2074947 | 8/1991 | Canada . |
| 2074947 A1 | 8/1991 | Canada . |
| 0 004 745 A1 | 10/1979 | European Pat. Off. . |

(List continued on next page.)

OTHER PUBLICATIONS

Chowdhury et al., "Catalytic Wet Oxidation of Strong Waste Waters," AIChE Symp. 151:71 (1975), pp. 46–58.

Freeman, "Innovative Thermal Hazardous Organic Waste Treatment Processes," Noyes Publications: Park Ridge, New Jersey (1985), pp. 12–33.

Gloyna, "Supercritical Water Oxidation—Deep Well Technology for Toxic Wastewaters and Sludes," Technical Report, The University of Texas at Austin, 1989.

(List continued on next page.)

*Primary Examiner*—Peter A. Hruskoci
*Attorney, Agent, or Firm*—Conley, Rose & Tayon, PC

[57] ABSTRACT

Systems and methods for heating, reacting, and/or treating a stream containing oxidizable matter. Recycle reactor is used alone or in conjunction with plug-flow reactor. Density differences in the recycle reactor facilitate flow within the recycle reactor without substantial external heat exchange.

92 Claims, 7 Drawing Sheets

U.S. PATENT DOCUMENTS

| | | |
|---|---|---|
| 2,767,233 | 10/1956 | Mullen, II et al. . |
| 2,824,058 | 2/1958 | Zimmermann . |
| 2,944,396 | 7/1960 | Barton et al. . |
| 3,047,003 | 7/1962 | Gurney . |
| 3,047,371 | 7/1962 | Krause et al. . |
| 3,101,592 | 8/1963 | Robertson et al. . |
| 3,129,587 | 4/1964 | Hallanger . |
| 3,149,176 | 9/1964 | Glazier et al. . |
| 3,207,572 | 9/1965 | Saul . |
| 3,282,459 | 11/1966 | Wilson . |
| 3,414,004 | 12/1968 | Bankston . |
| 3,431,075 | 3/1969 | Gunnell . |
| 3,449,247 | 6/1969 | Bauer . |
| 3,464,885 | 9/1969 | Land et al. . |
| 3,472,632 | 10/1969 | Hervert et al. . |
| 3,490,869 | 1/1970 | Heller . |
| 3,515,520 | 6/1970 | Hervert . |
| 3,549,314 | 12/1970 | Shah . |
| 3,606,999 | 9/1971 | Lawless . |
| 3,626,874 | 12/1971 | Grant . |
| 3,654,070 | 4/1972 | Pradt et al. . |
| 3,674,045 | 7/1972 | Millman et al. . |
| 3,682,142 | 8/1972 | Newkirk . |
| 3,716,474 | 2/1973 | Hess et al. . |
| 3,743,606 | 7/1973 | Marion et al. . |
| 3,761,409 | 9/1973 | McCoy et al. . |
| 3,804,756 | 4/1974 | Callahan et al. . |
| 3,849,075 | 11/1974 | Albright . |
| 3,849,536 | 11/1974 | Morgan . |
| 3,852,192 | 12/1974 | Fassell et al. . |
| 3,853,759 | 12/1974 | Titmas . |
| 3,876,497 | 4/1975 | Hoffman . |
| 3,876,536 | 4/1975 | Pradt et al. . |
| 3,886,972 | 6/1975 | Scott et al. . |
| 3,899,923 | 8/1975 | Teller . |
| 3,900,300 | 8/1975 | Lehman . |
| 3,912,626 | 10/1975 | Ely et al. . |
| 3,920,506 | 11/1975 | Morgan . |
| 3,920,548 | 11/1975 | Fassell et al. . |
| 3,929,429 | 12/1975 | Crouch . |
| 3,938,972 | 2/1976 | Sugimura . |
| 3,945,805 | 3/1976 | Costello et al. . |
| 3,945,806 | 3/1976 | Costello et al. . |
| 3,971,872 | 7/1976 | LeBoeuf . |
| 3,977,966 | 8/1976 | Pradt et al. . |
| 3,978,661 | 9/1976 | Cheng . |
| 3,984,311 | 10/1976 | Diesen et al. . |
| 4,000,068 | 12/1976 | Nelson et al. . |
| 4,005,803 | 2/1977 | Kent . |
| 4,010,098 | 3/1977 | Fassell . |
| 4,013,560 | 3/1977 | Pradt . |
| 4,017,421 | 4/1977 | Othmer . |
| 4,061,566 | 12/1977 | Modell . |
| 4,100,730 | 7/1978 | Pradt . |
| 4,113,446 | 9/1978 | Modell et al. . |
| 4,124,528 | 11/1978 | Modell . |
| 4,141,829 | 2/1979 | Thiel et al. . |
| 4,145,283 | 3/1979 | Topp et al. . |
| 4,146,359 | 3/1979 | Lumpkin et al. . |
| 4,147,624 | 4/1979 | Modell . |
| 4,174,280 | 11/1979 | Pradt et al. . |
| 4,191,012 | 3/1980 | Stoddard et al. . |
| 4,199,545 | 4/1980 | Matovich . |
| 4,212,735 | 7/1980 | Miller . |
| 4,215,094 | 7/1980 | Inao et al. . |
| 4,217,218 | 8/1980 | Bauer . |
| 4,221,577 | 9/1980 | Lowrie . |
| 4,221,763 | 9/1980 | Greene . |
| 4,229,296 | 10/1980 | Wheaton et al. . |
| 4,241,722 | 12/1980 | Dickinson . |
| 4,272,383 | 6/1981 | McGrew . |
| 4,284,015 | 8/1981 | Dickinson . |
| 4,292,953 | 10/1981 | Dickinson . |
| 4,312,837 | 1/1982 | Papp et al. .............................. 422/224 |
| 4,326,957 | 4/1982 | Rosenberg . |
| 4,338,199 | 7/1982 | Modell . |
| 4,344,785 | 8/1982 | Jensen . |
| 4,370,223 | 1/1983 | Bose . |
| 4,377,066 | 3/1983 | Dickinson . |
| 4,378,976 | 4/1983 | Rush . |
| 4,379,124 | 4/1983 | Fouquet . |
| 4,380,960 | 4/1983 | Dickinson . |
| 4,384,897 | 5/1983 | Brink . |
| 4,384,959 | 5/1983 | Bauer et al. . |
| 4,460,628 | 7/1984 | Wheaton et al. . |
| 4,485,003 | 11/1984 | Coenen et al. . |
| 4,488,866 | 12/1984 | Schirmer et al. . |
| 4,490,346 | 12/1984 | Cheng . |
| 4,510,958 | 4/1985 | Coursen . |
| 4,526,584 | 7/1985 | Funk . |
| 4,541,990 | 9/1985 | Mitterbacher . |
| 4,543,190 | 9/1985 | Modell . |
| 4,564,458 | 1/1986 | Burleson . |
| 4,593,202 | 6/1986 | Dickinson . |
| 4,594,164 | 6/1986 | Titmas . |
| 4,604,215 | 8/1986 | McCorquodale . |
| 4,643,890 | 2/1987 | Schramm . |
| 4,668,256 | 5/1987 | Billiet et al. . |
| 4,671,351 | 6/1987 | Rappe . |
| 4,683,122 | 7/1987 | Concordia et al. . |
| 4,692,252 | 9/1987 | Atwood et al. . |
| 4,698,157 | 10/1987 | Gillot . |
| 4,713,177 | 12/1987 | Atwood et al. . |
| 4,714,032 | 12/1987 | Dickinson . |
| 4,721,575 | 1/1988 | Binning et al. . |
| 4,733,852 | 3/1988 | Glasgow et al. . |
| 4,741,386 | 5/1988 | Rappe . |
| 4,744,908 | 5/1988 | Peterscheck et al. . |
| 4,744,909 | 5/1988 | Ferraro et al. . |
| 4,762,148 | 8/1988 | Marui et al. . |
| 4,765,900 | 8/1988 | Schwoyer et al. . |
| 4,767,543 | 8/1988 | Chornet et al. . |
| 4,774,006 | 9/1988 | Kaufmann . |
| 4,792,408 | 12/1988 | Titmas . |
| 4,793,153 | 12/1988 | Hembree et al. . |
| 4,801,090 | 1/1989 | Yoshida et al. . |
| 4,803,054 | 2/1989 | Sillerud et al. . |
| 4,822,394 | 4/1989 | Zeigler et al. . |
| 4,822,497 | 4/1989 | Hong et al. . |
| 4,853,136 | 8/1989 | Roussel et al. . |
| 4,853,205 | 8/1989 | Tolley et al. . |
| 4,861,484 | 8/1989 | Lichtin et al. . |
| 4,861,497 | 8/1989 | Welch . |
| 4,869,833 | 9/1989 | Binning et al. . |
| 4,872,890 | 10/1989 | Lamprecht et al. . |
| 4,880,440 | 11/1989 | Perrin . |
| 4,887,628 | 12/1989 | Bowe et al. . |
| 4,891,139 | 1/1990 | Zeigler et al. . |
| 4,898,107 | 2/1990 | Dickinson . |
| 4,928,885 | 5/1990 | Nakao . |
| 4,936,990 | 6/1990 | Brunsell et al. . |
| 4,962,275 | 10/1990 | Bruno . |
| 4,963,329 | 10/1990 | Burgess et al. . |
| 4,968,328 | 11/1990 | Duke . |
| 4,983,296 | 1/1991 | McMahon et al. . |
| 5,009,857 | 4/1991 | Hearle . |
| 5,011,614 | 4/1991 | Gresser et al. . |
| 5,052,426 | 10/1991 | Kasper . |
| 5,053,142 | 10/1991 | Sorensen et al. . |
| 5,057,220 | 10/1991 | Harada et al. . |
| 5,057,231 | 10/1991 | Mueller et al. . |
| 5,075,017 | 12/1991 | Hossain et al. . |

| | | |
|---|---|---|
| 5,106,513 | 4/1992 | Hong . |
| 5,110,581 | 5/1992 | Derrah . |
| 5,133,877 | 7/1992 | Rofer et al. . |
| 5,167,930 | 12/1992 | Fassbender . |
| 5,183,577 | 2/1993 | Lehman . |
| 5,186,910 | 2/1993 | Alagy et al. . |
| 5,192,453 | 3/1993 | Keckler et al. . |
| 5,199,853 | 4/1993 | Padden . |
| 5,207,399 | 5/1993 | Risberg et al. . |
| 5,221,486 | 6/1993 | Fassbender . |
| 5,230,810 | 7/1993 | Clark et al. . |
| 5,232,604 | 8/1993 | Swallow et al. .................. 210/759 |
| 5,232,605 | 8/1993 | Baur et al. . |
| 5,238,671 | 8/1993 | Matson et al. . |
| 5,240,619 | 8/1993 | Copa et al. . |
| 5,250,193 | 10/1993 | Sawicki et al. . |
| 5,252,224 | 10/1993 | Modell et al. . |
| 5,252,297 | 10/1993 | Nakai . |
| 5,280,701 | 1/1994 | Tolman . |
| 5,326,540 | 7/1994 | Chastagner . |
| 5,339,621 | 8/1994 | Tolman . |
| 5,358,646 | 10/1994 | Gloyna et al. ................. 210/762 |
| 5,370,799 | 12/1994 | Oddo et al. . |
| 5,384,051 | 1/1995 | McGinness . |
| 5,385,214 | 1/1995 | Spurgeon . |
| 5,387,398 | 2/1995 | Mueggenburg et al. . |
| 5,405,533 | 4/1995 | Hazlebeck et al. . |
| 5,417,937 | 5/1995 | Voight et al. . |
| 5,417,953 | 5/1995 | Capelli . |
| 5,421,998 | 6/1995 | Li et al. . |
| 5,425,883 | 6/1995 | Reid et al. . |
| 5,427,764 | 6/1995 | Barber . |
| 5,437,798 | 8/1995 | McCarthy et al. . |
| 5,454,950 | 10/1995 | Li et al. . |
| 5,492,634 | 2/1996 | Hong et al. . |
| 5,527,471 | 6/1996 | Hong et al. . |
| 5,536,385 | 7/1996 | Sheldon et al. . |
| 5,543,057 | 8/1996 | Whiting et al. . |
| 5,545,337 | 8/1996 | Hong . |
| 5,558,783 | 9/1996 | McGuinness . |
| 5,560,822 | 10/1996 | Bond et al. . |
| 5,560,823 | 10/1996 | Whiting . |
| 5,571,423 | 11/1996 | Daman . |
| 5,571,424 | 11/1996 | Ahluwalia . |
| 5,582,715 | 12/1996 | McBrayer et al. ............ 210/96.1 |

FOREIGN PATENT DOCUMENTS

| | | |
|---|---|---|
| 0 073 355 A1 | 3/1983 | European Pat. Off. . |
| 0 085 961 A1 | 8/1983 | European Pat. Off. . |
| 0 135 144 A1 | 3/1985 | European Pat. Off. . |
| 0 388 915 A1 | 9/1990 | European Pat. Off. . |
| 0 480 492 A1 | 4/1992 | European Pat. Off. . |
| 0 595 858 B1 | 4/1995 | European Pat. Off. . |
| 2 410 504 | 6/1979 | France . |
| 40 03 377 C1 | 8/1991 | Germany . |
| 53-091093 | 8/1978 | Japan . |
| 57-4225 | 1/1982 | Japan . |
| 62-68414 | 3/1987 | Japan . |
| 1-38532 | 8/1989 | Japan . |
| 521233 | 7/1976 | Russian Federation . |
| 483881 | 10/1977 | Russian Federation . |
| 576683 | 1/1980 | Russian Federation . |
| 8200067-0 | 1/1992 | Sweden . |
| 584671 | 2/1947 | United Kingdom . |
| 2 075 484 | 11/1981 | United Kingdom . |
| WO 90/01367 | 2/1990 | WIPO . |
| WO 91/11394 | 8/1991 | WIPO . |
| WO 81/03169 | 11/1991 | WIPO . |
| 92/18428 | 10/1992 | WIPO . |
| WO 92/21621 | 12/1992 | WIPO . |
| WO 92/21622 | 12/1992 | WIPO . |
| 93/00304 | 1/1993 | WIPO . |
| WO 93/00304 | 1/1993 | WIPO . |
| WO 93/02969 | 2/1993 | WIPO . |
| 93/21118 | 10/1993 | WIPO . |
| WO 94/11310 | 5/1994 | WIPO . |
| WO 95/33693 | 6/1995 | WIPO . |
| 95/26929 | 10/1995 | WIPO . |
| WO 95/33693 | 12/1995 | WIPO . |
| 96/02470 | 2/1996 | WIPO . |

OTHER PUBLICATIONS

Imamura et al., "Wet Oxidation of Acetic Acid Catalyzed by a Co—Bi Complex Oxides," Ind. Eng. Chem. Prod. Res. Dev., 21(4), pp. 570–575 (1982).

Lee et al., "Efficiency of Hydrogen Peroxide and Oxygen in Supercritical Water Oxidation of 2,4–Dichlorophenol and Acetic Acid," The Journal of Supercritical Fluids, 3 pp. 249–255 (1990).

Lu et al., "Selective Particle Deposition in Crossflow Filtration," Sep. Sci. and Technol., 24(7&8), 517–540 (1989).

Mahlman et al., "Cross–Flow Filtration in Physical Chemical Treatment of Municipal Sewage Effluents,"Oak Ridge Natl. Lab. Technical Report, EPA/600/2–76/025, Feb. 1976.

Modell et al., "Supercritical Water—Testing Reveals New Process Holds Promise," Solid Wastes Management, Aug. 1982.

Murkes, "Low–shear and High–shear Cross–flow Filtration," Filtration and Separation, 23(6), 364–365 (1986).

Murkes et al., Crossflow Filtration: Theory and Practice, John Wiley & Sons: New York, 1988.

Opatken, "Aqueous–Phase Oxidation of Sludge Using the Vertical Reaction Vessel System," EPA/600/2–87/022, Mar. 1987.

Perona et al., "A Pilot Plant for Sewage Treatment by Cross–Flow Filtration,: Oak Ridge Natl. Lab. Technical Report ORNL–TM–4659, Oct. 1974.

Shapira et al., Removal of Heavy Metals and Suspended Solids from Battery Wastewaters: Application of Hydroperm Cross–flow Microfiltration,: Gen. Battery Corp. Report EPA/600/2–81–147, Aug. 1981.

Thomason et al., "Supercritical Water Destruction of Aqueous Wastes," Hazardous Waste, 1(4), 453–467 (1984).

Teletke, "Wet Air Oxidation," Chem. Eng. Prog., 60(1), pp. 33–38, Jan. 1964.

Yang et al., "Homogenous Catalysis in the Oxidation of p–Chlorophenol in Supercritical Water," Ind. Eng. Chem. Res., 27(1), pp. 2009–2014 (1988).

Zimmermann, "New Waste Disposal Process," Chem. Eng., pp. 117–120, Aug., 1985.

Jacobs et al., "Phase Segregation," Handbook of Separation Process Technology, published by John Wiley & Sons (1987).

Stone & Webster Engineering Corp., "Assessment and Development of an Industrial Wet Oxidation System for Burning Waste and Low Grade Fuels," Final Report, Work Performed Under Contract DE–FC07 881D12711, Prepared for U.S. Department of Energy, Sep., 1989.

Todheide et al., "Das Zweiphasengebiet und die kritische Kurve im System Kohlendioxid—Wasser bis zu Druken von 3500 bar," Zeitschrift fur Physikalischo Chemie Neue Folge, Bd. 37, 8. 387–401 (1963).

Keng–Chen Chang et al., "Supercritical water oxidation of acetic acid by potassium permanganate," J. of Hazardous Materials, vol. 32, pp. 001–012.

Yoshiaki Harada, "Wet Catalytic Oxidation Process for Wastewater Treatment," Abstract (1991).

Sellchiro Imamura et al., "Wet Oxidation of Ammonia Catalyzed by Cerium–Based Composite Oxides," Ind. Eng. Chem. Prod. Res. Dev., vol. 24, No. 1, ,pp. 75–80 (1985).

Lei Jin et al., "The Effect of Supercritical Water on the Catalytic Oxidation of 1–4–Dichlorobenzene," presented by AIChE Spring Meeting, Orlando, FL, Mar. 19–23 (1990), Abstract.

Dong–Soo Lee et al., "Efficiency of $H_2O_2$ in Supercritical Water Oxidation of 2, 4–Dichlorophenol and Acetic Acid," presented at AIChE Spring Meeting, Orlando, FL, Mar. 18–22 (1990).

Teletzke et al., "Components of Sludge and Its Wet Air Oxidation Products," Journal WPCF, 39 (6):994–1005, 1967.

Conditt and Sievers, "Microanalysis of Reaction Products in Sealed Tube Wet Air Oxidations by Capillary Gas Chromatography," Anal. Chem., 56:2620–2622, 1984.

McGinnis et al., "Conversion of Biomass into Chemicals with High–Temperature Wet Oxidation," Ind. Eng. Chem. Prod. Reg, Dev., 22(4):633–636, 1984.

Baker, et al., "Membrane Separation Systems—A Research & Development Needs Assessment," Department of Energy Membrane Separation Systems Research Needs Assessment Group, Final Report, II, Mar. 1990.

Urusova, Phase Equilibria in the Sodium Hydroxide–Water and Sodium Chloride–Water Systems at 350–550 deg., Russian Journal of Inorganic Chemistry, 19–(3):450–454, 1974.

Valyashko, "Phase Equilibria in Water–Salt Systems: Some Problems of Solubility at Elevated Temperature and Pressure," High Temperature High Pressure Electrochemistry in Aqueous Solutions. National Association of Corrosion Engineers, 4:153–157, 1976.

Armellini and Tester, "Salt Separation During Supercritical Water Oxidation of Human Metabolic Waste: Fundamental Studies of Salt Nucleation and Growth," Society of Automotive Engineers, Inc., pp. 189–203, 1990.

Dell–Orco et al., "The Solubility of 1:1 Nitrate Electrolytes in Supercritical Water," Los Alamos National Lab Reporter, LA–UR–92–3359, pp. 1–17, 1992.

Martynova, "Solubility of Inorganic Compounds in Subcritical and Supercritical Water," High Temperature Electrochemistry in Aqueous Solutions. National Association of corrosion Engineers, 4:131–138, 1976.

Armellini and Tester, "Solubilities of Sodium Chloride and Sodium Sulfate in Sub– and Supercritical Water Vapor," AIChE National Meeting, Los Angeles, California, Nov. 17–22, 1991, pp. 1–15.

McBrayer et al., "Research and Development of a Commercial Supercritical Water Oxidation Process," Hazardous Material International 1993, Proceedings, 11th Annual Eng. Management and Technology Conference.

"Researchers Explore Applications for Supercritical Water Oxidation," The Hazardous Waste Consultant, Mar./Apr. 1994, pp. 1.11–1.15.

Collection of Information from presentations given to representatives of Texas in or about Dec. 1991 to Jan. 1992, including "Case 1" flow diagram, a "Reaction Injection System" diagram, a "Process Flow diagram," a "Case 2" flow diagram, a diagram entitled "TCA SCWO Unit Schedule" dated Jan. 10, 1992, a diagram entitled "Phases of Water at Moderate Pressures," a diagram entitled "Figure PD2 Properties of Water (3,200–4,400 psia)," a diagram entitled "Figure PD9 Basic Configuration of Supercritical Oxidation Unit," a diagram entitled "UTPilot Unit Coiled Reactor," a diagram plotting "temperature vs. Distance from reactor inlet," a chart and diagram entitled "Texaco Waste Run Dec. 15, 1991."

Handwritten Notes relating to work done in or about May, 1993 (9 pages).

Handwritten Notes by Roy McBrayer dated Jul./Dec. 1991 (5 pages).

Handwritten Notes relating to work done on or about Dec., 1991 (11 pages).

Handwritten Notes relating to work done on or about Jan., 1992 (14 pages).

Handwritten Notes by Jimmy Swan dated Aug. 7, 1991 and Aug. 27, 1991 (2 pages).

Handwritten Notes by James Eller dated Jul.–Nov., 1991 (5 pages).

Killilea et al., "The Fate of Nitrogen in Supercritical Water Oxidation" MODAR, Inc., Natick, Massachusetts 01760 USA.

Excerpts From Publication Showing Salt Mixture Properties (pp. 124, 780, 781, 814, 816).

A.G. Fassbender, Supercritical Water Oxidation Workshop, "The Dual Shell Pressure Balanced Vessel: A Reactor For Corrosive Applications," (11 pages).

Excerpts From Publication "Strategies for Sticky Salts," (2 pages).

Eco Waste Technologies, "Environmental Breakthrough: Huntsman Announces Successful Use of New Technology," (2 pages).

Austin American–Statesman, Kirk Ladendorf, Article entitled "Company Hopes Treatment Cuts Waste," (1 page).

Eco Waste Technologies, Circular on Supercritical Water Oxidation (5 pages).

Jimmy Griffith, "Destruction of Aqueous Organic Wastes by Supercirtical Water Oxidation," Jun. 15–17, 1994, (12 pages).

Dr. Earnest F. Gloyna, P.E., "Supercritical Water Oxidation Applications For Industrial Sludes," Jan. 30, 1992, (pp. 1–15).

Earnest F. Gloyna and Lixiong Li, "Supercritical Water Oxidation: An Engineering Update," Feb. 1992, (pp. 1–25).

Separations Research Program Center for Energy Studies, The University of Texas at Austin, "Separation Update," Spring 1994 issue, (pp. 1–4).

E.F. Gloyna, L. Li and R.N. McBrayer, "Engineering Aspects of Supercritical Water Oxidation," Wat. Sci. Tech., vol. 30, No. 9, 1994, (pp. 1–10).

Sheets, David Allan, B.S.Ch.E., Report entitled "Erosion Control in Supercritical Water Systems", University of Texas at Austin, May 1991, pp. i–ix and 1–72.

Tester, J.W., et al., "Supercritical Water Oxidation Technology: A Review of Process Development and Fundamental Research", 1991 ACS Symposium Series Paper on Emerging Technologies for Hazardous Waste Management, Oct. 1–3, 1991, Atlanta, Georgia, Chemical Engineering Department, Massachusetts Institute of Technology, Cambridge, Massachusetts, pp. 1–58.

Zimmerman, et al., "The Zimmerman Process and Its Applications in the Pulp and Paper Industry", Tappi, Aug. 1960, vol. 43, No. 8, pp. 710–715.

PCT International Search Report, International Application No. PCT/US92/06459.

Supercritical Water Oxidation Information Package, Aug. 1994, Eco Waste Technologies, pp. 1–41.

Derwent Abstracts of US 5232604, WO 9300304, US 5252224, EP 595858, pp. 1–10.

Dialog Patent Search, Jul. 19, 1995, pp. 1–8.

Excerpt from Master's Thesis entitled "Erosion Control in Supercritical Water Systems," by David Allen Sheets, May, 1991, pp. 40–50.

General College Chemistry, $5^{th}$ Edition, Keenan, Charles W. et al., pp. 179–180.

Derwent Abstract of WO9111394–A, pp. 1–2.

Derwent Abstract of WO9300304–A, pp. 1–2.

Bramlette et al., "Destruction of DOE/DP Surrogate Wastes with Supercritical Water Oxidation Technology", Sandia National Laboratories Report, Nov. 1990, pp. 1–35.

Barner et al., "Supercritical Water Oxidation: An Emerging Technology," presented at ACHEMA '91—International Meeting on Chemical Engineering and Biotechnology, Jun. 9, 1991.

Bramlette, et al., "Destruction of DOE/DP Surrogate Wastes with Supercritical Water Oxidation Technology," Sandia National Laboratories, Nov. 1990.

Derwent Abstract of EP 513186.

Derwent Abstract of EP 595858.

Dialog Patent Search, Mar. 9, 1995.

Dialog Patent Assignee Search, Jul. 19, 1995.

Dialog Patent Family Search, Jul. 19, 1995.

Dialog Patent Family Search, Sep. 1, 1995.

Dialog Patent Inventor Search, Mar. 10, 1995.

Dialog Patent Keyword Search, Apr. 26, 1995.

International Search Report issued in PCT/US95/04017.

International Search Report issued in PCT/US95/08799.

International Search Report issued in PCT/US95/09666.

McBrayer et al., "Operation of the First Supercritical Water Oxidation Industrial Waste Facility," EcoWaste Technologies, 1995.

PennWell Publishing Co., "Supercritical Water Oxidation Unit Destroys Organic Wastes," Oil & Gas Journal, Oct. 1994.

Cheremisinoff et al., editors, Pollution Engineering Practice Handbook, Ann Arbor Science Publishers, Inc., 1975, pp. 732–735.

Takahashi et al., "Subcritical and Supercritical Water Oxidation of CELSS Model Wastes."

Whitlock, David R., "Organic Reactions in Supercritical Water," Bachelors/Masters Thesis, Massachusetts Institute of Technology, May 1978.

EcoWaste Technologies, Fact Sheet, Aug. 1994.

Josephsons, "Supercritical Fluids," Environmental Science & Technology, vol. 16, No. 10, 1982, Easton, Penn., USA, pp. 548A–551A.

International Search Report for PCT/US 97/11306 dated Nov. 7, 1997.

HEATING AND REACTION SYSTEM AND METHOD USING RECYCLE REACTOR

This is a divisional of copending application Ser. No. 08/657,899 filed Jun. 7, 1996.

BACKGROUND OF THE INVENTION

1. Field of the Invention

This invention generally relates to systems and methods for heating and/or treating a stream containing oxidizable matter, particularly reactor systems and methods utilizing oxidation reactions at or near supercritical conditions for water. Such systems and methods may be particularly useful to treat organic waste in aqueous-organic waste streams.

2. Description of the Related Art

The treatment of organic waste is becoming increasingly important. Traditional means of handling organic waste, such as landfill isolation or incineration, have many drawbacks. These drawbacks include landfill leakage and air pollution from incomplete combustion during incineration.

Concerns over problems associated with traditional organic waste treatment solutions have led to new developments in waste treatment. One promising solution for the treatment of organic matter is the accelerated oxidation of organic matter in an aqueous stream at elevated temperatures and pressures. This treatment has been discovered to be especially efficient when reacting the organic matter with an oxidant at or near supercritical conditions for water. The thermodynamic critical point for water is a temperature of about 705° F. at a pressure of about 3200 psia. Above these conditions, water is supercritical.

The process of reacting organic matter with an oxidant at supercritical conditions for water is referred to as supercritical water oxidation. At temperatures and pressures above its thermodynamic critical point, water achieves a state similar to a dense gas. Some of the properties of supercritical water that are advantageous for the oxidation of organic matter are relatively low viscosity and relatively high organic solubility in a substantially single, dense phase that is similar to high-pressure, superheated steam. Thus, supercritical water tends to provide a dispersed reaction medium in which organic matter will oxidize with high efficiency when in the presence of an oxidant.

Supercritical water oxidation of organic matter generally produces carbon dioxide and water. These reaction products are generally easily separated and are non-toxic to the environment. Supercritical water oxidation achieves high destruction efficiencies of organic materials. Efficiencies of 99.99% or greater have been obtained. These high efficiencies and clean reaction products make supercritical water oxidation a significant technology for waste treatment.

Specially designed reactor systems have been developed for treatment of aqueous-organic streams by supercritical water oxidation. In a typical supercritical water oxidation system the aqueous-organic stream is fed into a reactor at conditions around the critical temperature for water. An oxidant (typically oxygen) is introduced in the reactor. The organic matter reacts with the oxidant and produces an effluent. The oxidation reaction produces a substantial amount of heat which results in the effluent being at a temperature significantly higher than the temperature of the aqueous-organic input stream.

An aqueous-organic input stream may typically be drawn from a holding tank and pressurized to above the critical point for water. A pump, such as a positive displacement pump, is used to pressurize the stream. A heat exchanger may be used to heat the input stream using heat from effluent from the reactor. Generally, an additional preheater is required to raise the temperature of the input stream to near the critical temperature for water when the stream enters the reactor. The preheater may be a gas-fired heater which continuously operates to heat the input stream to the reactor.

After the organic matter reacts with oxidant in the reactor, an effluent exits the reactor and flows through the heat exchanger. The system may include an effluent boiler to produce steam which may be used for electricity generation. The effluent may then flow through a cooler and control valve to further lower the effluent temperature and pressure. A liquid gas separator is typically used to separate the effluent into liquid and gas phases. The liquid effluent generally includes water saturated with carbon dioxide. The effluent gas may typically include about 90–95% carbon dioxide and 5–10% oxygen and be saturated with water.

The use of high pressures at elevated temperatures presents a serious problem in that it is difficult to construct a reactor or reaction chamber which can withstand supercritical water conditions. Generally as the temperature increases, the strength of construction material decreases. Supercritical pressures (generally greater than about 3,200 psia) at temperatures exceeding about 1,000° F. present an enormous challenge for any construction material, let alone even higher pressures (of the order of 10,000 psia) and temperatures. Such high pressures and temperatures may be desirable for a number of reasons, including dissolution of inorganic salts under supercritical conditions. The harsh corrosive environment inside the reaction chamber also presents a serious design challenge.

Maintaining control of the reaction temperature is important. In some instances, the exothermic reactions proceed so rapidly that, unless controlled, they generate temperatures which endanger the integrity of the reaction vessel. It is important to control the temperature of the reaction to ensure that the organic matter is fully oxidized. The reaction temperature for proper oxidation is a function of the type and concentration of organic matter in the input stream. If the temperatures within the reactor are allowed to fall under certain limits, the reaction products may be incomplete, new phases may be formed in the reaction zone, or the reaction may cease to take place altogether.

Many of the following patents and patent applications relate to supercritical water oxidation methods and/or systems:

U.S. Pat. No. 5,403,533 to Hazlebeck et al., U.S. Pat. No. 4,141,829 to Thiel et al., U.S. Pat. No. 4,292,953 to Dickinson, U.S. Pat. No. 4,338,199 to Modell, U.S. Pat. No. 4,377,066 to Dickinson, U.S. Pat. No. 4,380,960 to Dickinson, U.S. Pat. No. 4,543,190 to Modell, U.S. Pat. No. 4,564,458 to Burleson, U.S. Pat. No. 4,593,202 to Dickinson, U.S. Pat. No. 4,594,164 to Titmas, U.S. Pat. No. 4,792,408 to Titmas, U.S. Pat. No. 4,822,394 to Zeigler et al., U.S. Pat. No. 4,822,497 to Hong et al., U.S. Pat. No. 4,861,497 to Welch et al., U.S. Pat. No. 4,891,139 to Zeigler et al., U.S. Pat. No. 4,113,446 to Modell et al., U.S. Pat. No. 5,106,513 to Hong, U.S. Pat. No. 4,898,107 to Dickinson, U.S. Pat. No. 4,983,296 to McMahon et al., U.S. Pat. No. 5,011,614 to Gresser et al., U.S. Pat. No. 5,053,142 to Sorensen et al., U.S. Pat. No. 5,057,231 to Mueller et al., U.S. Pat. No. 5,133,877 to Rofer et al., U.S. Pat. No. 5,183,577 to Lehmann, U.S. Pat. No. 5,192,453 to Keckler et al., U.S. Pat. No. 5,221,486 to Fassbender, U.S. Pat. No. 5,232,604 to Swallow et al., U.S. Pat. No. 5,232,605 to Baur et al., U.S. Pat. No. 5,240,619 to Copa et al., U.S. Pat. No. 5,250,193 to Sawicki et al., U.S. Pat. No. 5,252,224 to Modell et al., U.S. Pat. No. 4,822,497 to Hong et al., U.S. Pat. No. 5,551,472 to McBrayer et al., U.S. Pat. No. 5,755,974 to McBrayer et al., U.S. Pat. No. 5,620,606 to McBrayer et al., U.S. Pat. No. 5,582,715 to McBrayer et al., U.S. Pat. No. 5,591,415 to McBrayer et al., U.S. Pat. No. 5,552,039 to McBrayer et al., and U.S. Pat. No. 5,770,174 to Eller et al. The above-referenced patents and patent applications are hereby incorporated by reference.

SUMMARY OF THE INVENTION

The invention generally relates to a system/method for heating and/or treating a stream. The system includes a recycle reactor. The recycle reactor typically includes a conduit configured in a loop. The conduit loop may include multiple conduits or conduit portions having different lengths, bends, or diameters. Also, the conduit loop is preferably at least partially vertically aligned.

A stream containing oxidizable matter enters one side of the recycle reactor through a feed input. The recycle reactor loop is preferably configured so that the input stream flows around the loop to the other side where an oxidant is added through an input. The oxidant reacts with the oxidizable matter from the input stream. The reactor loop is adapted to contain the oxidation reaction at supercritical conditions for water. A portion of the resulting reaction product is withdrawn from the recycle reactor through an effluent opening. The remaining reaction product stream flows around (recycles) to mix with the input stream.

The input stream may enter the reactor at a temperature below the critical temperature for water. Preferably the recycled reaction product stream mixing with the input stream raises the temperature to the point where the oxidizable matter reacts with the oxidant. Thus, an advantage of the invention is that the input stream may enter the recycle reactor at a temperature substantially lower than the critical temperature for water. In some embodiments the input stream may enter the reactor at ambient temperature, and the recycle flow rate may be sufficient to raise the temperature of the input stream to a reaction temperature.

To begin operation, the input strenn may be heated, but after the oxidation reaction begins, the reaction can in some embodiments be substantially self-maitaning due to the recycling of a portion of the hot reaction product stream. Therefore, an advantage of the invention is that the recycle reactor may not require preheaters or heat exchangers to heat the input stream to near critical temperature before entering the reactor. Some preheating may be used depending on the type and content of the input stream in order to raise the input stream temperature so that the reaction will occur at the necessary temperature for proper oxidation However, the amount of heating required for such input streams is reduced by the recycling of the hot reaction products stream. Thus a smaller preheater or heat exchanger may be used, resulting in a more compact and economical system.

The recycle reactor is preferably configured such that the difference in fluid densities between the input "leg" of the reactor and the reaction "leg" of the reactor creates a thermosiphon effect, thereby creating recycle flow. The recycle reactor may include a circulation device, such as a jet pump, to enhance the recycle flow and facilitate the startup of the system.

The system may include a downstage soak or plug-flow reactor to complete oxidation of any remaining oxidizable matter in the effluent. The effluent may also flow through a boiler for steam generation, a cooler, a pressure reduction valve, or gas-liquid separator(s).

Controlling the temperature of the reaction product is important in supercritical water oxidation reactors. The temperature tends to require adjustment to varying degrees depending upon the type and content of the input stream. Also, the temperature preferably does not rise above a maximum limit, thereby protecting the mechanical integrity of the reactor. An embodiment of the invention provides initial reaction temperature control by adjusting the ratio that the recycled reaction product mixes with the input stream. The system may include a temperature measuring device to monitor the effluent or reaction product temperature. The recycle reactor may be adapted to adjust the recycle ratio by varying the distance that the feed input conduit is inserted into the reactor or by adjusting the cross-sectional area of the feed input conduit. By controlling the recycle ratio, the invention provides a relatively uncomplicated mechanism for controlling the initial reaction temperature. The system may also include devices for controlling the amount of oxidant input to the recycle reactor or stopping the oxidant flow if the reaction temperature reaches a predetermined maximum limit.

The recycle reactor may treat miscible or non-miscible organic matter. In one embodiment water is input to the reactor as the input stream and a concentrated non-miscible organic stream enters the reactor through a feed input near the oxidant input.

The invention provides a method for oxidation of oxidizable matter in an aqueous stream. The invention may include:

inputting an input stream into a first portion of the reactor, raising the input stream to a temperature such that the oxidizable matter in the input stream will react with oxygen;

flowing the input stream into a second portion of the reactor, wherein the first portion and second portion of the reactor form a loop;

adding oxygen into the second reactor portion for reacting with the oxidizable matter from the input stream to create a stream containing reaction products;

flowing a portion of the stream containing reaction products out from the second conduit portion; and recycling a portion of the stream containing reaction products into the first conduit portion, wherein the recycled portion mixes with the input stream to raise the temperature.

The method may further include adjusting the amount of product stream that is recycled and mixed with the input stream to control the reaction temperature. The method may also include preheating the input stream as a function of the reaction product temperature or the content or type of material in the input stream. Controlling the recycle ratio may be performed by adjusting the input conduit insertion distance or diameter. Similarly, the residence time of the reaction may be controlled. The oxygen input flow may also be controlled.

The system and method of the present invention provide a recycling reactor for supercritical water oxidation. The reactor advantageously recycles a portion of the reaction product stream. The ratio of the recycled stream to the input stream may be advantageously controlled for adjusting the residence time and temperature of the oxidation reaction. Thus, complications and additional equipment such as preheaters, heat exchangers, and reactor stages may be minimized. The recycle reactor system may provide a compact and economical solution for organic treatment by supercritical water oxidation. This invention may also be applied to non-supercritical systems.

DETAILED DESCRIPTION

Figure 1:
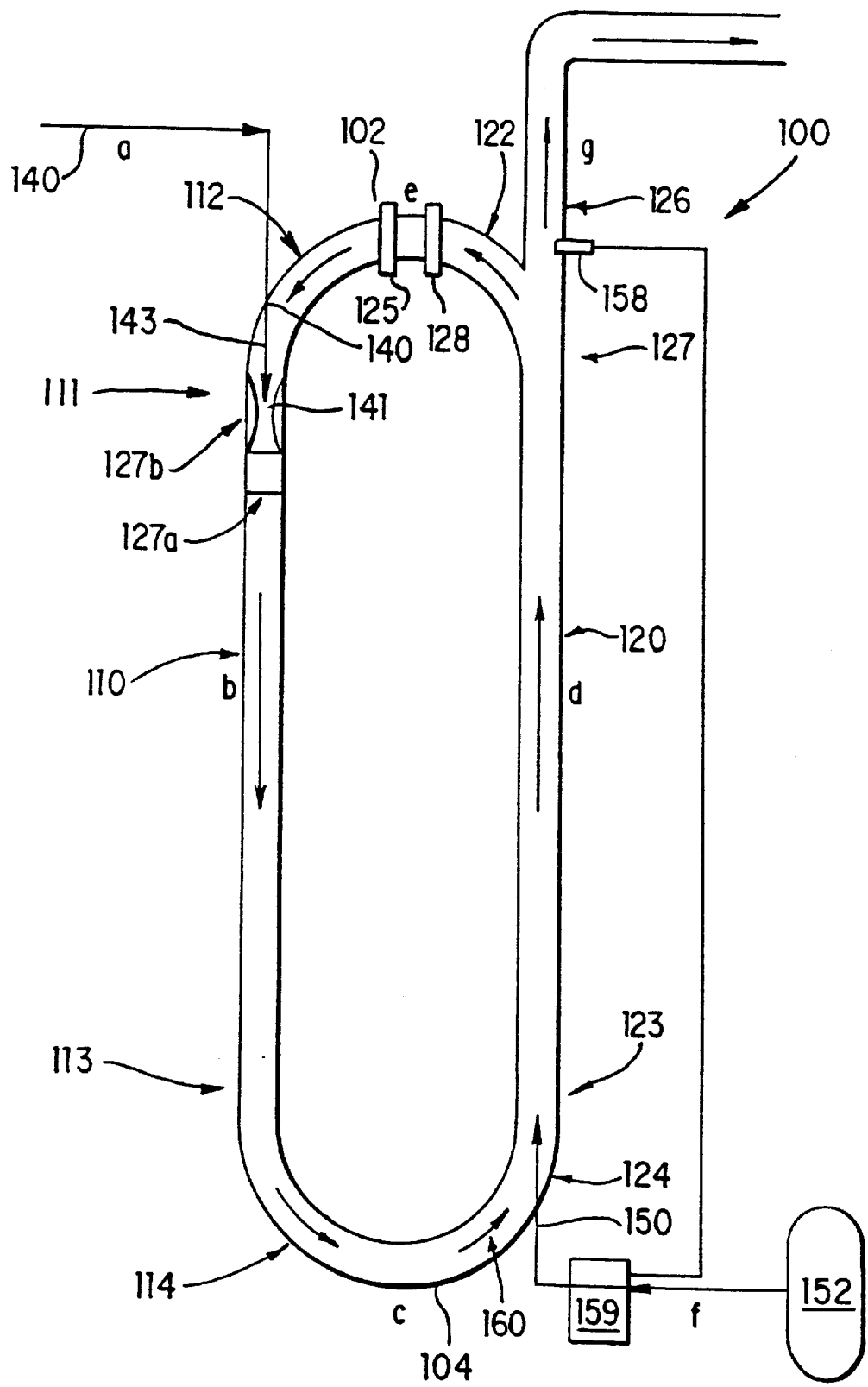
FIG. 1 depicts a system with a recycle reactor.

FIG. 1 depicts an embodiment of the invention. FIG. 1 shows a system that may be used for heating an input stream that is below the supercritical temperature for water to a temperature above the supercritical temperature of water. This system may be used to treat and/or react all or part of a stream containing oxidizable (e.g, organic) matter. It includes a recycle reactor 100 which is constructed to contain fluid at supercritical conditions for water during use. Throughout the following description the term "ignition temperature" denotes the minimum temperature that a stream must obtain to experience a relatively rapid, significant rise in temperature due to the heat generated from the oxidation of the stream.

Recycle reactor 100 includes a first substantially vertically aligned conduit 110 having a top end 111 and a bottom end 113. The first conduit 110 is connected to an input stream conduit 140 such that the input stream is introduced into the first conduit 110 from the input stream conduit 140 during use. Recycle reactor 100 also includes a second substantially vertically aligned conduit 120 having a top end 121 and a bottom end 123. The second conduit 120 is adapted to contain a reaction of oxidizable matter with an oxidant during use. The reaction generally produces a reaction products stream that is hotter and less dense than the input stream. The reaction products stream flows upwardly through the second conduit during use. Recycle reactor 100 also includes a top conduit 102 connecting the top end 111 of the first conduit 110 to the top end 121 of the second conduit 120, and a bottom conduit 104 connecting the bottom end 113 of the first conduit 110 to the bottom end 123 of the second conduit 120.

As shown in FIG. 1, recycle reactor 100 is in the shape of an oval loop with curved conduits 112, 114, 122, and 124, however other reactor "looped" shapes such as squares, rectangles, circles, etc. would also be operable within the scope of the invention. Curved conduits 112, 114, 122, and 124 are advantageous in that they tend to prevent erosion and/or plugging at the turning points in the reactor.

Conduits 110 and 120 are only "substantially vertically aligned" which means, in the context of this patent, that these conduit 110 and 120 are at least partially vertically aligned such that gravitational forces will exert on downward force on fluids within these first and second conduit 110 and 120. Absent other forces in place, fluids in these first and second conduit 110 and 120 will tend to be forced downward by such gravity from the top ends 111 and 121 to the bottom ends 113 and 123. Conduits 102 and 104 are preferably but not necessarily substantially horizontally aligned.

Recycle reactor 100 preferably includes an oxidant source 152 connected to the recycle reactor 100 via oxidant conduit 150 such that oxidant is introduced during use from the source 152 into the recycle reactor 100 at a location downstream of the first conduit 110 but upstream of the top conduit 102. For insance, conduit 150 may be located such that oxidant is introduced into conduits 104 or 120. Preferably conduit 150 is located near the bottom end of second conduit 120 such that oxidation occurs and thereby tends to heat the stream and cause reaction products to flow upwardly through second conduit 120. In this manner the thermosiphon effect (caused by density differences between streams within the reactor) within the recycle reactor is enhanced. This thermosiphon effect is preferably used to move fluid in the recycle reactor without any substantial cooling or heating of fluids in the recycle reactor from an external source.

The oxidant may be an oxidizing agent such as ozone, oxygen, hydrogen peroxide, air, nitric acid, perchlorates, permanganates, or other known oxidants in the art.

Recycle reactor 100 preferably includes an effluent conduit 126 connected to the recycle reactor 100 downstream of the location that oxidant is introduced into the recycle reactor 100, the effluent conduit 126 being connected to allow at least some of the reaction products stream to flow from the recycle reactor and into the effluent conduit during use.

The recycle reactor 100 is configured such that fluid flows during use from the first conduit 110 to the bottom conduit 104, the bottom conduit 104 to the second conduit 120, and the second conduit 120 to the top conduit 102. For instance, as shown in FIG. 1 fluid may flow via paths a, b, c, d, e, and then a. Oxidant may join this fluid via path f. A portion of the reaction products stream may exit the recycle reactor via path g.

Preferably at least a portion of the reaction products stream recycles during use from the top conduit 102 to the first conduit 110, thereby mixing with and heating the input stream to form a mixture above the supercritical temperature for water. Thus the input stream may preferably be heated to above the oxidation reaction ignition temperature without substantial heat exchange with an external source of heat—that is, without substantial heat exchange with other fluids via a heat exchanger, fired heater, or the like. This is advantageous because typically heat exchangers and/or fired heaters are costly to build and operate, especially when such equipment is designed to operate at or near supercritical conditions for water. Instead of using such equipment, heat is provided from the heated recycled stream, the heat having been generated from the oxidation that occurred after the oxidant was added.

A method of the invention may involve heating an input stream below the supercritical temperature for water to a temperature above the supereritical temperature of water. The method may include the following:

introducing the input stream into a recycle reactor 100;

flowing the inputted stream through the bottom end 113 of the first conduit 110 and then into a bottom end 123 of the second conduit 120;

introducing oxidant at a location downstream of the first conduit but upstream of the top conduit;

reacting oxidizable matter with an oxidant in the second conduit 120, the reaction producing a reaction products stream that is hotter and less dense than the input stream;

flowing the reaction products stream flows upwardly through the second conduit 120 during use;

flowing at least a portion of the reaction products stream into an effluent conduit 126 at a location downstream of the location that oxidant is introduced into the recycle reactor, flowing at least a portion of the reaction products stream from the second conduit 120 to the top conduit 102; and recycling at least a portion of the reaction products stream from the top conduit 102 to the first conduit 110, wherein the recycled reaction products stream mixes with and heats the input stream to form a mixture at or near the desired ignition temperature, all without substantial heat exchange with an external source of heat.

The top conduit 102 may include a one way valve 125 (e.g., a check valve) adapted to allow fluid to flow from the top conduit 102 to the first conduit 110 during use, and to prevent fluid from flowing from the first conduit 110 to the top conduit 102 during use. In this manner fluid flow in a selected direction within the recycle reactor may be assured.

Preferably the recycle reactor 100 is configured such that a stream driving force is caused by density differences between the fluid in the first conduit 110 and the fluid in the second conduit 120. This stream driving force is preferably greater than stream friction and momentum losses in the recycle reactor. In this manner, colder fluid in first conduit 110 will tend to fall downwardly towards the bottom end 113, and thence onward to second conduit 120. Oxidation in or before the second conduit 120 tends to heat and lessen the density of the fluid, thereby causing it to rise within the second conduit 120. The downward forces in the first conduit 110 tend to combine with the upward forces in the second conduit 120 to cause a thermosiphon effect which, preferably, is greater than fluid friction losses, thereby facilitating movement of fluid within the recycle reactor 100. Of course, pressure and velocity forces also affect the fluid in the recycle reactor 100. For instance, in the system of FIG. 1 the process of withdrawing effluent from near the top end 121 of the second conduit 120 tends to "pull" fluid upwardly in the second conduit 120. Likewise, adding fluid from input conduit 140 into the first conduit 110 tends to "push" fluid downwardly in first conduit 110.

Oxidant, water, and/or oxidizable matter may be added with the input stream via input conduit 140. Preferably oxidizable matter and water may be added via input conduit 140 and oxidant may be added via oxidant conduit 150. Alternately, water may be added via input conduit 140, and oxidizable matter may be added via an oxidizable matter conduit 160.

The input stream may typically enter the recycle reactor 100 at a temperature less than supercritical (e.g., less than 200° F.) during use.

The system may include a controller 128 (e.g., a valve, an orifice, etc.) adapted to vary the amount of reaction products stream recycled into the first conduit 110.

Preferably the system includes a circulation device 127 (e.g., a pump such as a jet pump) coupled to the recycle reactor 100 and being adapted to enhance the recycle of the reaction products stream into the first conduit 110. Jet pump 127a is preferably used during system startup. This device 127 may be adapted to facilitate the recycling of at least a portion of the reaction products stream into the first conduit. Device 127b may be a flow restriction device (e.g., orifice). Devices 127a and 127b may be used separately or in combination with one another. This circulation device 127 is preferably located in conduit 110 downstream of input stream conduit 140.

Figure 2:
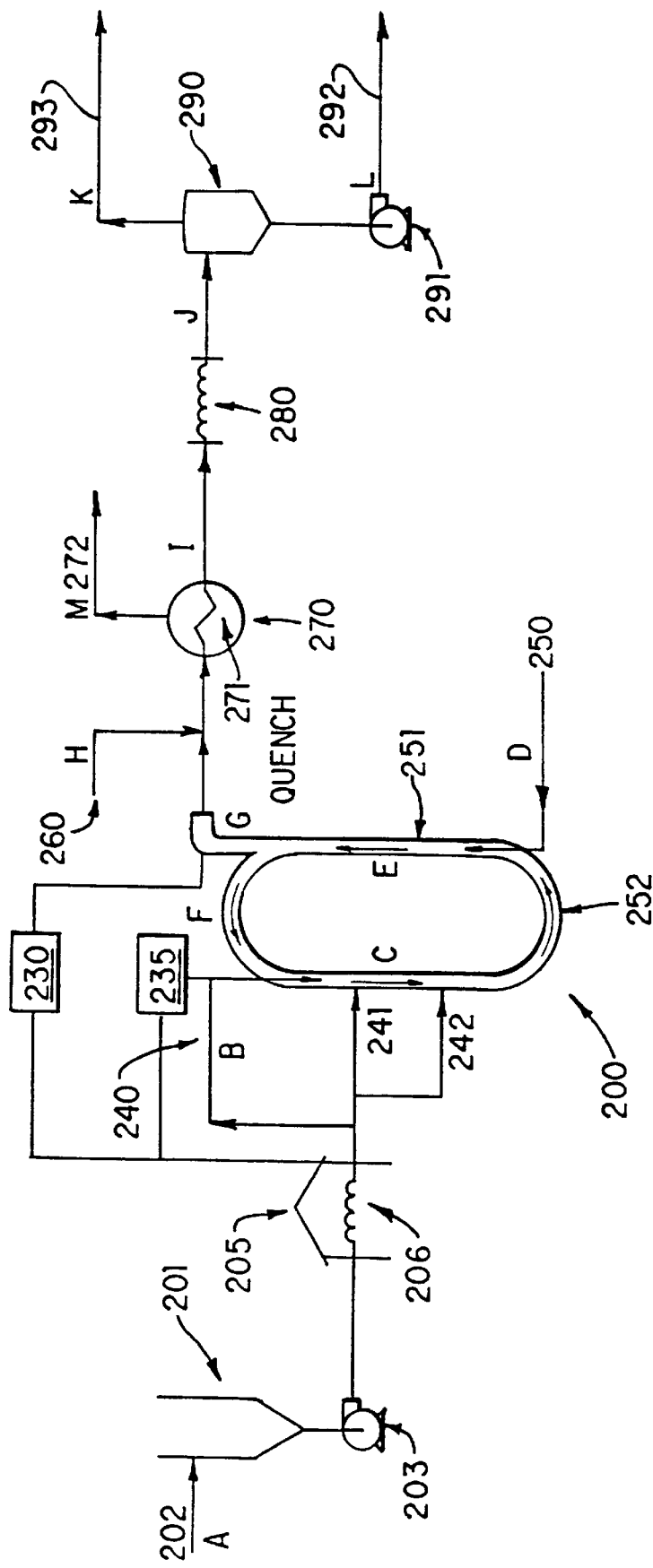
FIG. 2 depicts a system with a recycle reactor and other equipment.
Figure 3:
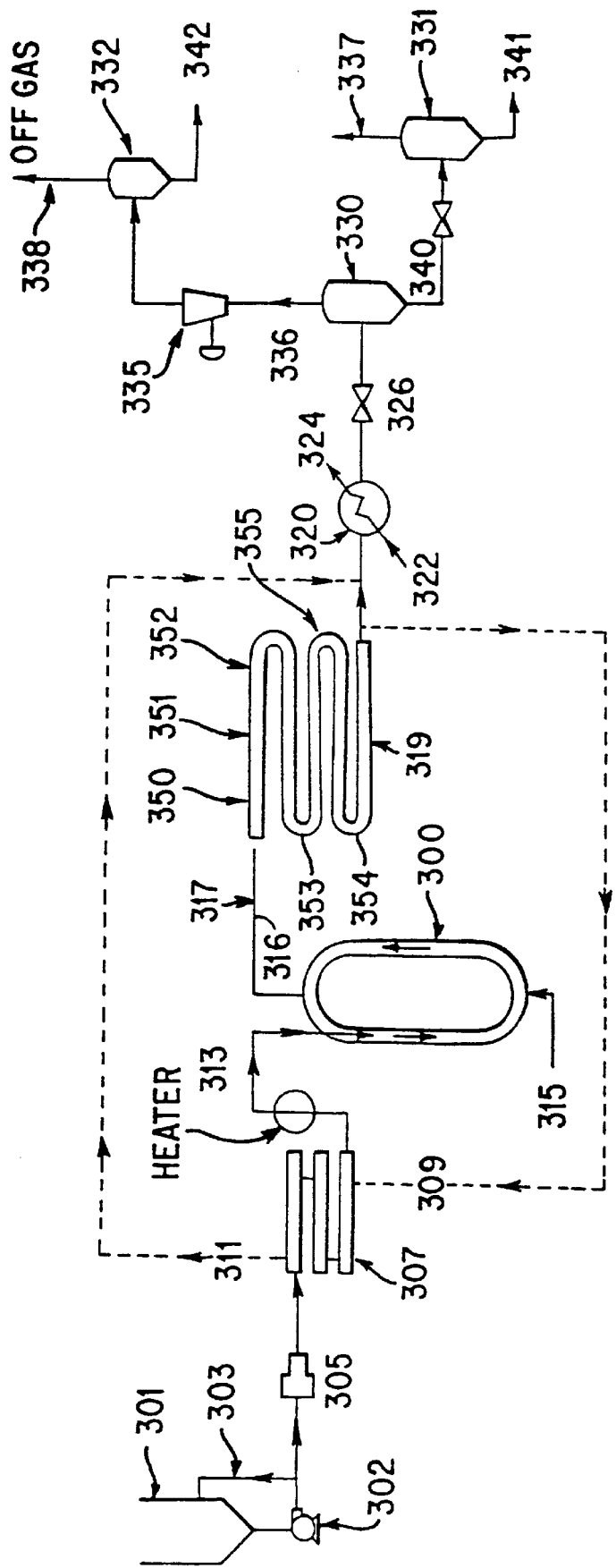
FIG. 3 depicts a system with a recycle reactor and a plug-flow reactor.

The recycle reactor 100 in FIG. 1 may be adapted to fit within a system such as is shown in FIGS. 2–3.

As shown in FIG. 2, a system of the invention may also include a container 201 adapted to hold input fluid including, e.g., an organic fluid. The input fluid may be a waste or byproduct from an input stream source 202. A pump 203 may be coupled to the container 201. The pump 203 may be adapted to draw fluid from the container 201, and then pump the fluid into the recycle reactor 200 at a pressure above about 3200 psia. Organic fluid from a container and/or pump may also be introduced via an oxidizable matter conduit 260.

The system may also include a heater 205 coupled to the input stream conduit 240, the heater 205 being adapted to heat the input stream. Heater 205 may be a heat exchanger or, for example, a gas fired heater fed by gas via line 206.

In FIG. 2, oxidant and/or oxidizable matter may be introduced into the recycle reactor 200 via one or more of conduits 250, 251, or 252. The input stream may be introduced into the recycle reactor via one or more of conduits 240,241, or 242.

Additional oxidant may be added to the effluent from the recycle reactor via line 260. This additional oxidant serves to "finish" reaction of any remaining oxidizable matter in the effluent. Cooling water may be added prior to or simultaneously with oxidant.

Effluent from a recycle reactor may be fed to heat recovery unit 270. In this unit 270, heat may be recovered and used to transform water in line 271 to steam in line 272. The fluid from the unit 270 may be further cooled with an air cooler 280 and then sent to a liquid-gas separator 290. In the separator 290 gaseous products such as carbon dioxide and water vapor may be transported and/or vented via conduit 293, and liquids may be pumped with pump 291 into conduit 292.

Temperature control is important in oxidation systems operating at elevated conditions, especially when such operation is at or about supercritical conditions. System conditions should be maintained within the maximum design parameters of the equipment being used. Thus a system of the invention may include a temperature measuring system 230 coupled to the recycle reactor 200 and coupled to the heater 205. This temperature measuring system 230 is preferably adapted to measure a temperature of the reaction products stream. The system 230 is preferably adapted to operate the heater 205 to adjust the input stream temperature responsive to (e.g., as a function of) the temperature of the reaction products stream. For instance, as the temperature of the reaction products stream increases, the temperature of the input stream may be decreased, and vice versa. In this manner the reaction products stream temperature may be controlled and/or maintained within equipment design limits.

Preferably the heater 205 is operated to maintain the temperature of the reaction products stream between about 705° F. and 1200° F. The temperature measuring system may measure the reaction products temperature in the effluent conduit 126, the second conduit 120, or the top conduit 102.

In a system of the invention an organic content monitor 235 may be coupled to the input stream. The organic content monitor 235 is preferably connected to measure the organic content of the input stream, and then send a signal to the heater 205 to adjust the input stream temperature as a function of the organic content of the input stream. The heater 205 may be directed to provide less heat to the input stream as the organic content of the input stream increases, and vice versa. Again, one goal of such a control system is to control the input stream temperature based on the organic content of the input stream before the input product stream enters the recycle reactor, thereby also (indirectly) controlling the temperature of the reaction products stream. The heater 205 is preferably operated such that the temperature of the reaction products stream is maintained between about 705° F. and 1200° F.

The amount of recycle from conduit 102 to first conduit 110 tends to be important in setting the residence time in the second conduit 120 (which is preferably the reaction zone). In addition, adjusting the amount of recycle may facilitate establishing temperatures and compositions throughout the recycle reactor 100. Preferably the ratio of the reaction products stream recycled to and mixed with the input stream is about 1 part input stream per about 1–6 parts (more preferably, 1–4 parts) of reaction products stream.

Recycle can be controlled by varying the height of the denser fluid column in the first conduit 110 and/or by varying the pressure drop in the recycle reactor 100. The height of the denser fluid column may be set by the length of a feed conduit 143 (i.e., the length between points 140 and 141 in FIG. 1). This length determines the level where the input stream enters the recycle reactor 100. The pressure drop in the recycle reactor can also be adjusted to a desired level by increasing or decreasing the cross-sectional area of the feed conduit 143 in the first conduit 110.

In one embodiment the cross-sectional area of a portion of conduit 110 may be adjusted by adjusting a valve located within conduit 110. The pressure drop through the reactor may be controlled by adjusting the valve, thereby controlling the rate of recycle flow.

Preferably the temperature of the oxidizable matter in the recycle reactor 100 is high enough so that, when in the presence of an oxidant, oxidation results and the desired effluent temperature is obtained.

Oxidant (e.g., oxygen) fed to the recycle reactor is preferably set so that at least about 95% of the required stoichiometric amount of oxidant for complete combustion of oxidizable matter (e.g., organics) enters the reactor. The residence time in the reactor reaction zone is preferably set so that about 99–100% of the oxygen fed into the recycle reactor 100 is consumed. These conditions may be specified to keep the amount of oxidant recycled to less than about 1% of the oxidant fed to the recycle reactor 100, and more preferably to a negligible level. Additional oxidant may be added to the recycle reactor effluent prior to such effluent entering a plug-flow tubular reactor. Prior to the addition of the additional oxidant, the recycle reactor effluent may need to be cooled before additional oxidation reactions occur. This cooling may be performed externally by a variety of methods (e.g., indirect contact with a cooling medium in a heat exchanger) or internally by use of a quench stream (see, e.g., U.S. Pat. Nos. 5,582,715 and 5,770,174). In the subsequent plug-flow reactor additional residence time is provided in order to complete the combustion reaction.

Methods/systems to guard against excessive temperature in the recycle reactor 100 are preferred in order to: (1) maintain the oxidizable matter content of the stream in the first conduit at or above a minimum limit so auto-ignition is possible, (2) keep the temperature of the stream in the first conduit at or above the auto-ignition temperature, (3) hold material flow through the recycle reactor 100 within a controlled range so the recycle reactor 100, as sized, can meet design specifications for effluent purity, (4) allow sufficient residence time in the reaction zone so that at least about ninety-nine percent, and preferably all of the oxidant fed into the recycle reactor 100 is consumed, and the oxidant recycled is preferably negligible but at least less than about one percent of the oxidant fed to the recycle reactor 100, and/or (5) limit the maximum temperature in the recycle reactor 100 and thereby limit corrosion in the recycle reactor, and also avoid exceeding the maximum temperature tolerances of system equipment.

The system may also include an oxidant controller 159 adapted to control the rate that oxidant is introduced into the second conduit. The oxidant controller 159 is preferably adapted to control the oxidant rate such that the second conduit receives less than a stoichiometric amount of oxidant necessary to react with all of the oxidizable matter from the input stream. In an alternate embodiment, a temperature measuring device 158 is coupled to the oxidant controller 159. The temperature measuring device 158 is adapted to measure the temperature of the reaction products stream (for instance, a thermowell and electronic thermometer may be installed in the effluent stream). The oxidant controller 159 is preferably operable to change the flow rate of the oxidant into the second conduit as a function of the temperature of the reaction products stream. For instance, the oxidant flow rate may be decreased as the reaction products stream increases, and vice versa.

As shown in FIG. 3, a system of the invention may include a reactor that substantially exhibits plug-flow characteristics coupled to the recycle reactor and connected to receive effluent containing reaction products from the recycle reactor. The plug-flow reactor is preferably adapted to oxidize oxidizable matter remaining in the effluent from the recycle reactor. An oxidant source may be connected to introduce oxidant into the effluent and/or plug-flow reactor from the recycle reactor. A cooling system may be used to remove heat from the effluent prior to the introduction of the oxidant into the effluent to initiate oxidation reactions.

Preferably the recycle reactor is adapted to react up to about 99% of total organic content of the input stream, and the plug-flow reactor is adapted to react at least 99.99% of total organic content of the input stream. In this manner the recycle reactor is used to heat and partially treat (e.g., oxidize) oxidizable matter in the input stream. The plug-flow reactor serves to "finish" the treatment of streams initially reacted in the recycle reactor.

Preferably the input stream is introduced into the recycle reactor near the top end of the first conduit, the oxygen is introduced into the recycle reactor near the bottom end of the second conduit, and the effluent flows from the recycle reactor near the top of the second conduit.

In an alternate embodiment, a heater may be coupled to second conduit 120 to heat the stream within such conduit. Such heating can lessen the density of the stream and facilitate reaching the ignition temperature of the stream (which may be especially important during start-up).

The recycle reactor 100 may include various conduits forming a loop. The conduit cross-sectional area is not necessarily constant throughout the recycle reactor 100. In addition, the conduit may have substantial bends to form a loop.

In a preferred embodiment of the recycle reactor, the oxidation reaction occurs at supercritical conditions for water (at least 3200 psia and at least 705° F.). The oxidation reaction produces heat which elevates the temperature of the reaction product stream. Since the reaction product stream may have a temperature from about 705° F. to about 1200° F., the effluent stream temperatures are also generally within the temperature range of about 705° F. to about 1200° F. When the recycle stream mixes with the input stream in the first conduit 110, the temperature of the resultant mix stream is elevated. Generally enough of the hot reaction products stream is recycled to elevate the temperature of the mixed stream in the first conduit 110 to about 550–850° F. Also, the internal pressure in the reactor may be about 3600 psia to 4500 psia. Therefore, the recycle reactor 100 is preferably designed to tolerate supercritical temperature and pressure conditions.

In one embodiment water may be input into the recycle reactor 100 through the input stream conduit 140. This embodiment of the recycle reactor 100 may be particularly useful for treating oxidizable matter which is non-miscible in water. In this embodiment the oxidizable matter may enter the recycle reactor just prior to the oxidant entry point (e.g., via conduit 160) and then react with the oxidant at supercritical conditions for water, thereby forming a reaction product stream in second conduit 120.

Referring now to FIG. 3, an embodiment of a system for treating oxidizable matter is depicted. A preferably aqueous solution containing oxidizable matter may be held in a feed tank 301. A pump system 302 recirculates bottoms from tank 301 back to the top of tank 301 via conduit 303. Another pump system 305 draws the solution from tank 301 and pumps the solution to a heat exchanger 307. Hot fluid such as steam or effluent from a reactor enters the heat exchanger 307 via conduit 309, heats the solution, and then exits the heat exchanger via conduit 311.

The solution may flow through a preheater (see 205 in FIG. 2) before entering the recycle reactor. The preheater may be gas fired and is preferably located downstream of heat exchanger 307 and upstream of recycle reactor 300.

Conduit 313 transports the solution from heat exchanger 307 or preheater 205 into the recycle reactor 300. Recycle reactor 300 may, in one embodiment, be about 3 meters in height, and the recycle may be about 3 parts recycled stream per 1 part feed stream. Oxidant such as liquid oxygen may be introduced into the recycle reactor 300 via conduit 315, or subsequent to the recycle reactor via conduit 317.

One purpose of heat exchanger 307 and/or preheater 205 is to heat the solution to a temperature near the critical temperature for water when the system first begins operation. Once oxidation begins in recycle reactor 300, the preheater 205 may no longer be required and may be shut off, thereby saving fuel costs. This ability to eliminate preheating once the reaction begins is an advantage of such a system. The solution may be feed into the recycle reactor 300 at temperatures below 200° F. and even at ambient temperature.

Alternatively, preheater 205 may be used to adjust the temperature of the reaction product stream in the recycle reactor depending on the type and content of the oxidizable matter in the solution.

The oxidizable matter is substantially oxidized in the recycle reactor 300. The treated effluent stream leaving the recycle reactor is typically about 705° F. to 1200° F. The effluent stream flows through an effluent conduit 316 and may flow into a plug-flow (e.g., "soak") reactor 319. Plug-flow reactor 319 may be straight tube, coiled tube, or bent tube such as is shown in FIG. 3.

Additional oxidizable matter, oxidant and/or water may also be added either separately or simultaneously via conduits 350–355 into the plug-flow reactor. Typically oxidant is added (which raises stream temperature and reaction rates) and water is added (to cool stream temperature).

From reactor 319 the solution may flow to steam boiler 320. Water enters boiler 320 via conduit 322 and exits via conduit 324. The effluent stream is cooled and steam produced from the effluent stream may be used for electric power generation. The effluent stream may also flow through a pressure valve 326 to reduce the pressure of the stream, and through a heat exchanger or cooler to further cool the effluent stream. Finally, the effluent stream may flow through phase separators 330, 331 and 332 to separate gases such as $CO_2$ and steam (see conduits 336, 337, and 338) from liquids such as water (see conduits 340, 341, and 342). An expander 335 may extract energy and reduce the pressure of gases exiting phase separator 330.

It is anticipated that the feed to a system of the invention will typically include one of the following: (1) an aqueous organic solution with the organic miscible in water, (2) a non-miscible organic which is fed to the system separate from a water stream, or (3) a water slurry of solids mixed in the aqueous feed stream. In the case of a concentrated non-miscible organic, the water for dilution can be fed separately to the first conduit 110 and the non-miscible organic can be fed near the oxidant entry point into the reactor (e.g., at the base of second conduit 120).

In one example, the feed may be a miscible organic in a water solution (for example, a 10–20 wt % methanol solution) which is fed to a recycle reactor at ambient temperature. Such relatively concentrated solutions, when 95 weight percent (wt %) of the methanol is reacted with an oxidant such as oxygen, will result in effluent temperatures ranging from 705 to 1200 degrees F.

Recycle from the "upflow" conduit (e.g., in FIG. 1, second conduit 120) to "downflow" conduit (e.g., in FIG. 1, first conduit 110) is typically a function of: (a) the difference in densities between the fluid in the upflow and downflow conduits, (b) the height and cross-sectional area of the upflow and downflow conduits, (c) the rate of flow through the reactor loop, and (d) the friction and velocity head losses in the reactor loop.

In one embodiment the feed to the recycle loop is fed at room temperature. The feed to the recycle loop may be mixed with oxidant prior to its introduction into the recycle loop. Preferably the feed composition is such that, when reacted with oxygen, the stream temperature peaks in the range of 900 to 1200 degrees F.

Figure 4:
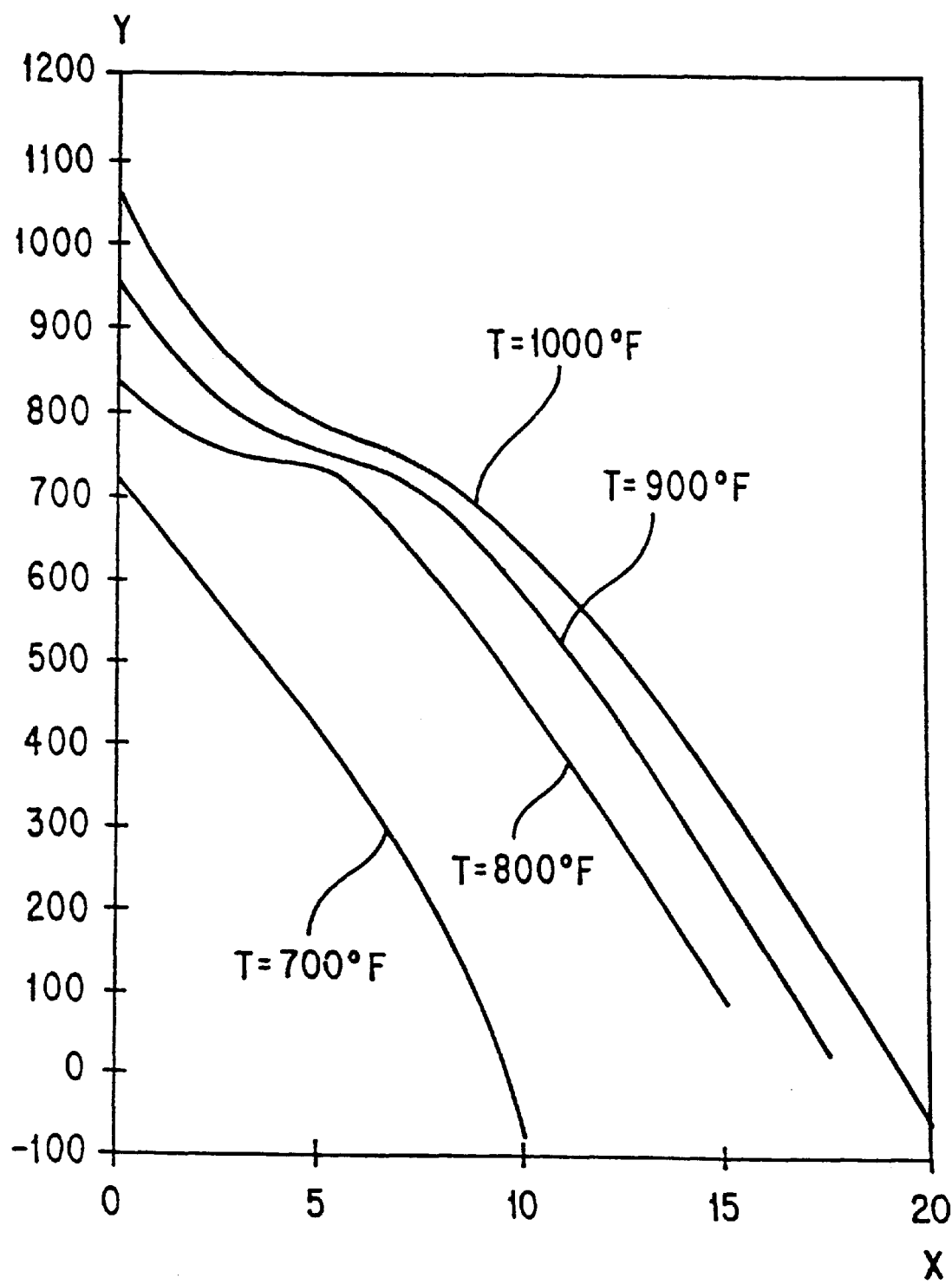
FIG. 4 plots effluent temperature curves for various recycle reactor inflow temperatures and inflow methanol concentrations.

Calculated preheat temperatures of the feed, feed concentrations, and resulting effluent temperatures for reactions using a system such as is shown in FIG. 1 are presented below in Table 1. A heat balance may be used to determine an appropriate temperature of the feed to the recycle reactor. The heat content of the effluent stream may be determined by summing the heat content of the feed and the heat of combustion and subtracting any heat lost by the system to the surroundings. The relationship between the temperature of an 18.4 weight percent methanol aqueous feed solution and the temperature of the effluent is shown in FIG. 4. In Table 1, it is assumed that 95% of an organic feed (i.e., methanol and water) is oxidized to $CO_2$ and water vapor, and that the heat loss from the system is 5% of the total heat added to the system. The heat of combustion is assumed to be 8584 BTU per pound of methanol.

TABLE 1

FEED TEMPERATURE AT GIVEN FEED CONCENTRATION AND GIVEN EFFLUENT TEMPERATURE

| EFFLUENT TEMP. FEED WT % METHANOL | 700 | 800 | 900 | 1000 |
|---|---|---|---|---|
| 0.0 | 705 | 830 | 950 | 1055 |
| 2.5 | 574 | 755 | 810 | 879 |
| 5.0 | 419 | 742 | 754 | 782 |
| 7.5 | 229 | 607 | 702 | 730 |
| 10.0 | 27 | 470 | 566 | 636 |

FIG. 4 is a plot of the data listed in Table 1. The "x" axis of FIG. 4 represents the weight percent of methenol in an aqueous feed stream. The "y" axis of FIG. 4 represents the feed temperature required to acaeve the effluent temperature shown next to the curved lines in FIG. 4.

From FIG. 4 it can be seen that the use of the recycle reactor is especially valuable in avoiding the addition of surplus heat to the system when the feed concentration is greater than 10 weight percent methanol.

If an organic such as octane is considered, then much leaner mixtures furnish sufficient heat of combustion. Assuming that (a) 95 percent of the organic feed is oxidized to $CO_2$ and water, (b) 5 percent of the total heat added to the system is lost to the surroundings, and (c) the heat of combustion is 19,150 BTU per pound of octane, then to achieve a 1000° F. effluent strea would require: (1) a 2.5 weight percent aqueous octane feed to enter the reactor at 776° F., a 5.0 weight percent aqueous octane feed to enter the reactor at 614° F., and an 8.4 weight percent aqueous octane feed to enter the reactor at 61° F.

FIG. 4 thus provides a guide as to when and how much preheat is required as a function of feed concentration and effluent temperature. If preheat is needed, then the amount of heat added may be controlled by adjusting the amount of fuel gas added to a preheater as a function of effluent stream temperature.

As discussed above, a minimum temperature (e.g., auto-ignition temperature) can be maintained in the downflow conduit by controlling the recycle ratio. The recycle ratio may be maintained at a higher rate than required to insure that a minimum stream velocity is maintained in the recycle reactor. Such a minimum stream velocity can be important to prevent settling of solids and/or fouling in the recycle reactor. A valve and/or conduit may be incorporated near the bottom of the recycle reactor to allow solids or slurries to be periodically or continuously drawn from the recycle reactor.

Figure 6:
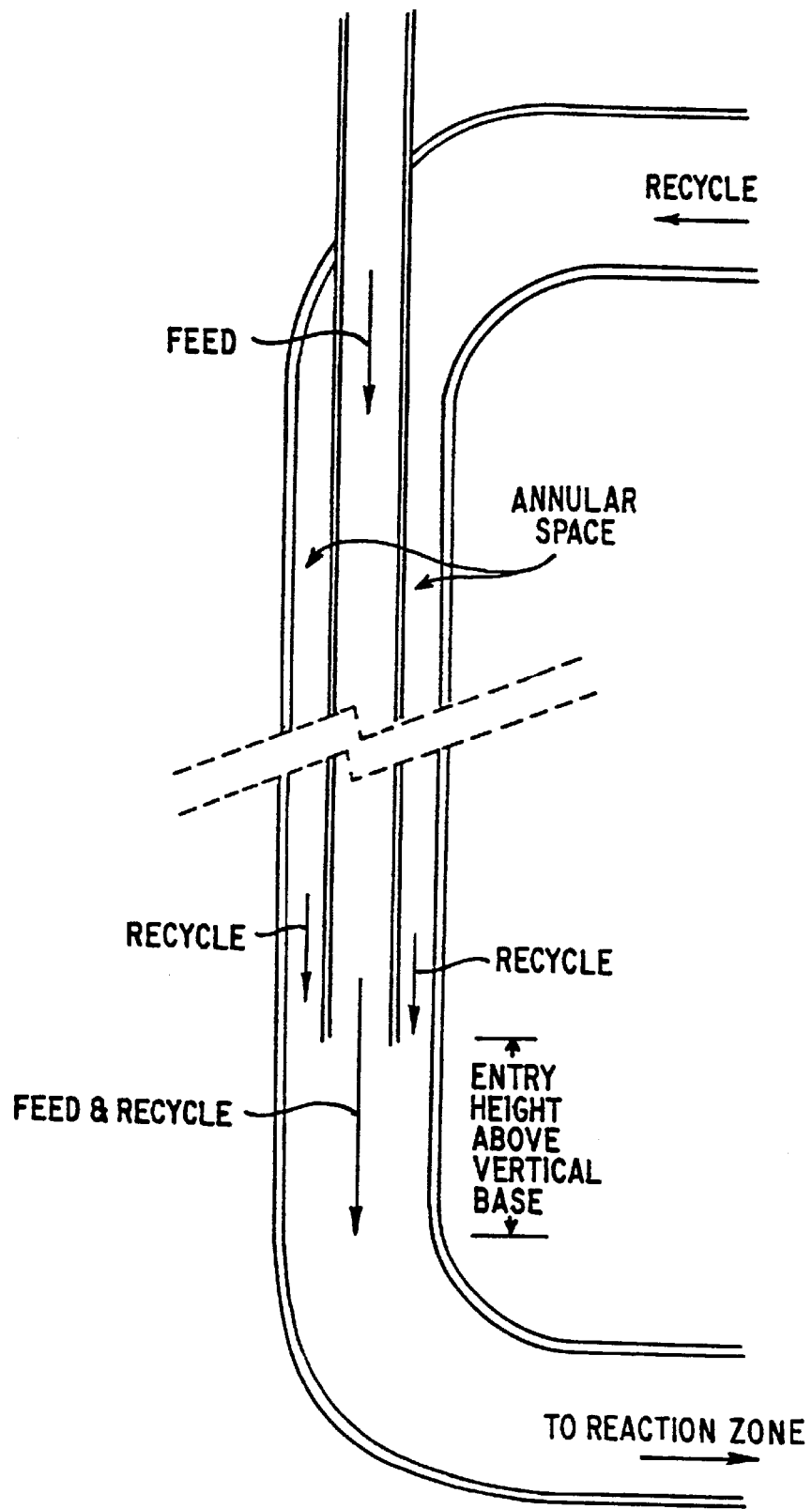
FIG. 6 depicts the position of a feed tube within a downflow conduit in an embodiment of the invention.

The recycle ratio, using natural circulation, depends upon (a) the difference between the densities of the fluid in the downflow leg (i.e., "heavy leg") and the fluid in the upflow leg (i.e., "light leg"), (b) the difference in elevation between the top of the feed tube and the top of the effluent conduit, (c) the difference in elevation between the top of the circuit (i.e., point e in FIG. 1) and the base of the circuit (i.e., point c in FIG. 1), and (d) and any obstructions to flow present in the flow circuit. The diameter of the feed tube determines the frictional pressure drop in the downflow leg, since flow tends to be obstructed as it passes through the annulus formed between the outside of the feed tube and the downflow conduit. The system is at equilibrium when the recycle ratio is increased to a value where the friction and momentum losses in the system essentially balance the driving force induced by the difference in the densities of the fluids in the downflow and upflow legs and the configuration of the recycle reactor (e.g., location of the top of the feed tube and the top of the effluent conduit, etc.). The preferred method of controlling the recycle ratio is to first set the diameter of the feed inlet tube to create a pressure drop within a desired range in the downflow leg. The location (e.g., height) that the feed is introduced into the downflow leg may then be adjusted to further control the recycle ratio. FIG. 6 illustrates the position of the feed tube within the downflow leg in one embodiment.

Figure 5A:
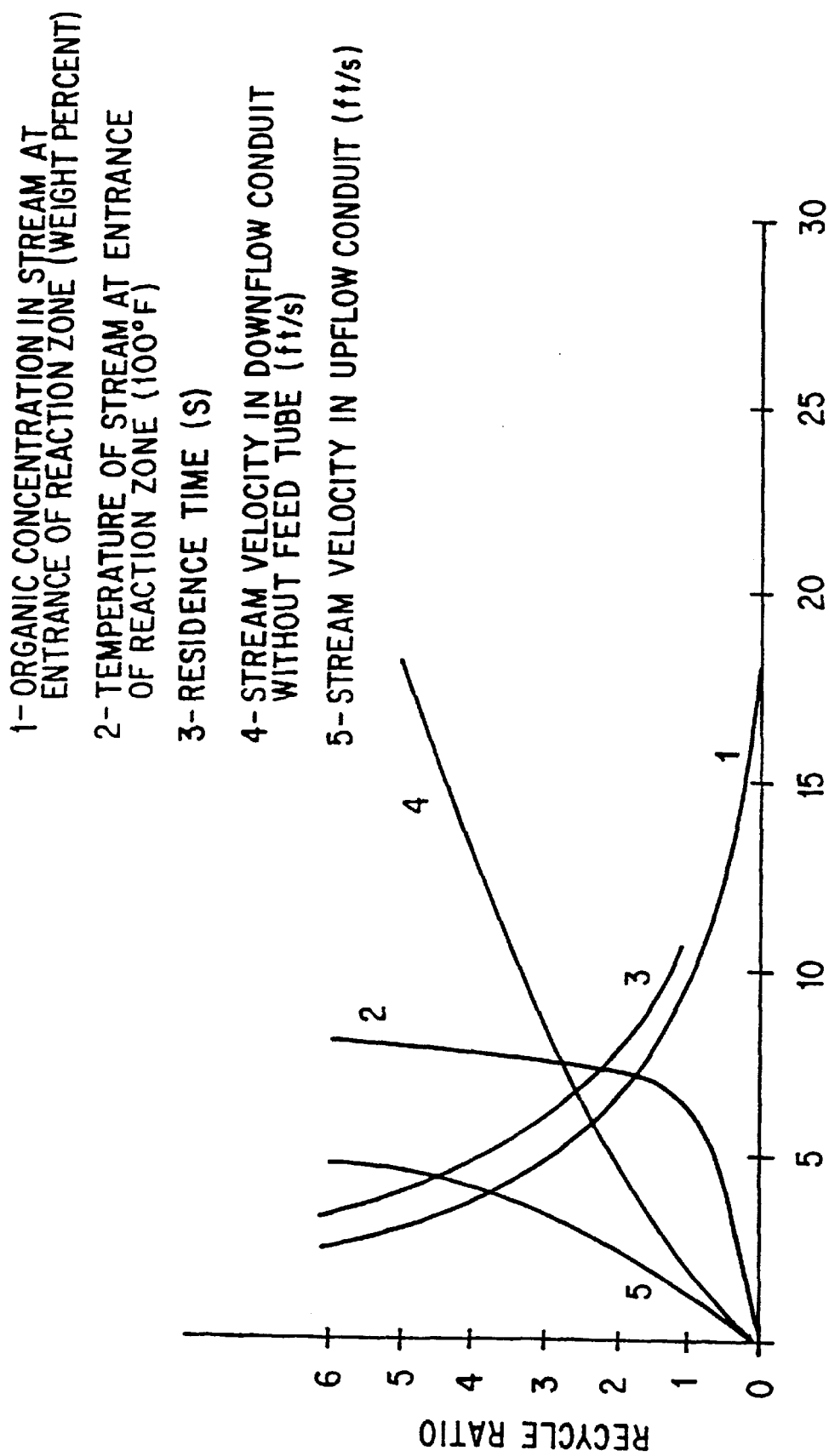
FIGS. 5a/b depict the effect of various system parameters on recycle ratio.
Figure 5B:
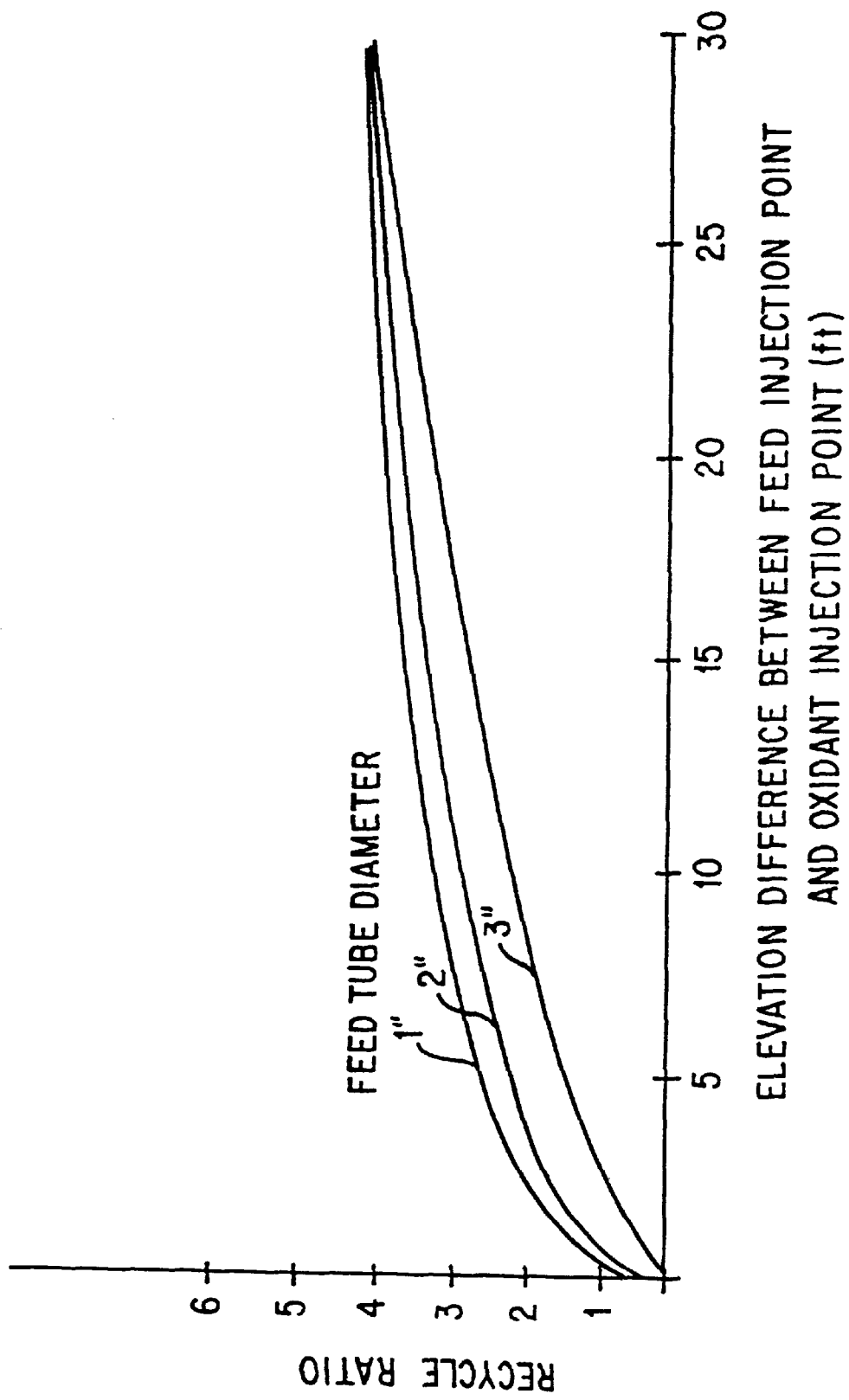

It is to be understood that the point in the down flow conduit where the feed is introduced into the recycle reactor impacts the recycle flow in the recycle reactor. Tables 2a/b summarize calculated data illustrating the impact on the reactor operating conditions of (a) the diameter of the feed tube, (b) the recycle ratio, and (c) the location of the feed tube in the recycle reactor. FIGS. 5a/b display calculated data related to Tables 2a/b. The variable termed "elevation difference" in Table 2a is the difference in elevation between the point at which feed is introduced into the downflow conduit and the point at which oxidant is added into the upflow conduit. In the cases shown in FIGS. 2a/b, the point at which oxidant is added into the reactor coincides with the base of the upflow conduit. The "residence time" plotted in FIG. 5a is the amount of time needed by a stream portion to pass through the reaction zone (i.e., the region in the recycle reactor that extends from the point of oxidant entry to the point where the effluent conduit is coupled to the reactor). Table 2a provides the stream velocity in the downflow leg, "annular space", and feed tube. Shown in FIG. 6, the "annular space" is the region available for flow around the outside of the feed tube within the downflown conduit.

In FIGS. 5a/b and Tables 2a/b, an 18.4 weight percent aqueous methanol feed stream is fed into the recycle reactor at ambient temperature (e.g., about 62 F.). No preheat is required to obtain the desired effluent temperature of 1000 degrees F. The system pressure is about 4000 psia. The feed enters the recycle reactor via a tube within the downflow conduit. The diameter of the feed tube may be changed to obtain the desired recycle ratio. Increasing the feed tube diameter decreases the area available for flow in the conduit around the feed tube, thereby increasing the differential pressure of the system and lowering the recirculating flow rate. Table 2b shows that decreasing the annular space between the feed tube and the down flow leg tends to result in a decrease in the recycle flow if the vertical height of the reactor is not increased. Results are shown for a feed rate to the recycle reactor of 10,000 pounds per hour. Table 2a provides operating conditions for cases where the outside diameter of the feed tube is 1 inch, 2 inches, and 3 inches, the inside diameter of the downflow leg is 4 inches, and the inside diameter of the upflow leg is 10 inches. The reaction zone is normally 20 feet high, however the height of the reaction zone may be increased to increase the recycle ratio.

The effect of the diameter and position of the feed tube on the recycle ratio is illustrated below in Table 2a. In the cases shown in Table 2a, the height of the downflow and upflow legs is 10 feet.

It is to be understood that all of the data in the table and figures included herein are calculated estimates. Actual results will tend to vary dependent on specific system conditions.

TABLE 2a

Effect of Feed Tube Diameter and Feed Entry Location on Recycle Ratio and Flow Velocity

| Feed Pipe Diameter (in) | Recycle Ratio | Elevation Difference (ft) | Velocity (ft/s) | | |
|---|---|---|---|---|---|
| | | | Downflow Leg | Annular Space | Feed Tube |
| 1 | 1 | 0.5 | 2.33 | 2.19 | 8.50 |
| 1 | 2 | 2.7 | 4.87 | 4.92 | 8.50 |
| 1 | 4 | 30.0 | 13.62 | 13.68 | 8.50 |
| 2 | 1 | 0.8 | 2.33 | 2.92 | 2.12 |
| 2 | 2 | 4.0 | 4.87 | 6.50 | 2.12 |
| 2 | 4 | 32.0 | 13.62 | 18.25 | 2.12 |
| 3 | 1 | 2.7 | 2.33 | 5.0 | 0.94 |
| 3 | 2 | 9.5 | 4.87 | 11.14 | 0.94 |
| 3 | 4 | 33.0 | 13.62 | 31.13 | 0.94 |

Once the recycle ratio is established, many process variables become fixed. The relationship of the recycle ratio on several key variables is illustrated below in Table 2b. Table 2b provides the residence time of the stream in the reaction zone and the organic content and temperature of the stream immediately before it enters the reaction zone.

TABLE 2b

Effect of Recycle Ratio on Key Variables

| Recycle Ratio | Organic Content (weight percent) | Temperature (F.) | Residence Time(s) | Upflow Leg Velocity (ft/s) |
|---|---|---|---|---|
| 1 | 9.20 | 629 | 2.33 | 1.82 |
| 2 | 6.13 | 736 | 4.87 | 2.63 |
| 4 | 3.68 | 774 | 13.62 | 4.24 |

It is preferred that (a) the organic content of the stream be at least 2.5 weight percent when the stream reaches the entrance of the reaction zone, (b) the temperature of the stream be at least 680 degrees F. when the stream reaches the entrance of the reaction zone, (c) the residence time of the stream in the reaction zone be at least 8 seconds, (d) the velocity of the stream in the upflow conduit be at least 2.0 ft/s, (e) the velocity of the downflow conduit be at least 4 ft/s in the presence of a feed tube, and (f) the velocity of the feed stream in the feed tube be at least 2 ft/s.

Some advantages of a system of the invention are as follows:

1) Preheating to attain a specified auto-ignition temperature is often not required because the recycle stream will supply such heat directly to the feed stream. Thus, the need for heat exchangers and heaters may be eliminated.
2) Concentrated feeds can be processed without staging the reaction (such staging often requires the injection of water "quench" and oxidant along a reaction path); and
3) Material flow through the reactor is minimized, thereby eliminating some processing equipment and assuring minimum size for required equipment.

In an alternate embodiment, process feed stream may be preheated to: (1) get the feed to an auto-ignition temperature of 600 to 750 degrees F. and (2) provide sufficient heat to the feed so such heat, when combined with the heat released by the oxidation reaction, heats the effluent to a temperature within the range of 705 to 1200 degrees F.

It is believed that a recycle reactor system can provide significant cost savings related to preheating feed streams in supercritical oxidation systems. In supercritical oxidation systems using only a plug-flow reactor, the feed must be preheated to an auto-ignition temperature of 600 to 700 degrees F., regardless of feed concentration, in order to ignite the stream when it mixes with an oxidant. In contrast, in a supercritical oxidation system which incorporates a recycle reactor, the auto-ignition temperature may be achieved in the recycle loop even if the feed enters at much lower or ambient temperature. Preheating of feed thus becomes dependent only upon furnishing sufficient heat to reach the desired effluent temperature.

The following different operating case conditions are presented to illustrate the use of a system which includes a recycle reactor.

Case 1

A 15 weight percent methanol solution enters the system at ambient temperature. Without being preheated, it flows to a recycle reactor such as shown in FIG. 2. Table 3 shows the flow conditions at steady state operation at various locations A–M located throughout a system processing 10,000 pounds/hour of aqueous feed (locations A–M are shown in FIG. 2).

The feed stream enters the recycle reactor at 4300 psia and at ambient temperature. Within the downflow leg, the temperature of the flowing stream reaches a temperature of 740 degrees F. by mixing 2 parts of the hot recycle stream at 1000 degrees F. with 1 part of fresh feed stream at ambient temperature. The stream after oxygen injection and ignition reaches 1000 degrees F. The recycle and effluent streams are also at 1000 degrees F. The reactor pressure is within a range of 4200 to 4300 psia. At the reactor outlet, the stream composition contains less than 0.01 percent of the organics entering in the process feed stream, with 99.99 wt % having been oxidized to water and carbon dioxide. For materials harder to oxidize than methanol, a longer reactor could be used or, alternately, a downstream plug-flow, tubular reactor could be installed to provide extra retention time for the final stage of the oxidadon.

The plant is heated to start-up temperatures using a fired heater 205 which is shut down once organics and oxygen are introduced and a flame front is established. A smaller gas heater (e.g., 5 gallons per minute) can be used since start-up can be conducted at lower than steady state flow conditions.

The recycle ratio used is 2 parts recycle per one part feed and is controlled by positioning the feed inlet tube at the proper height in the downflow leg.

The hot effluent gases from the reactor are cooled first by heat exchange to generate high pressure steam and then by indirect air or water cooling. The cooled stream flows through a pressure letdown valve to a liquid-vapor separator where the gases are separated by from the liquid stream.

It is believed that Case 1 presents a preferred case for application of a system of the invention.

TABLE 3

| | Feed Stream A | Feed to Recycle Reactor B | Recycle Reactor Downflow C | Oxygen to Recycle Reactor D | Recycle Reactor Upflow E | Reactor Recycle F | Recycle Reactor Effluent G | Oxygen Added to Effluent H | Effluent From Steam Boiler I | Cooler Effluent J | Vapor From L/V Separator K | Liquid From L/V Separator L | Steam Boiler M |
|---|---|---|---|---|---|---|---|---|---|---|---|---|---|
| METHANOL | 1500 | 1500 | 1500 | | | | | | | | | | |
| WATER | 8500 | 8500 | 25133 | | 26820 | 16633 | 10188 | | 10188 | 10188 | 60 | 10128 | 9000 |
| OXYGEN | | | | 2250 | | | | 100 | | | | | |
| CARBON DIOXIDE | | | 3367 | | 5430 | 3367 | 2062 | | 2062 | 2062 | 2026 | 36 | |
| TOTAL, LB/HR | 10000 | 10000 | 30000 | 2250 | 32250 | 20000 | 12250 | 100 | 12350 | 12350 | 2098 | 10164 | 9000 |
| TEMP, °F. | 100 | 100 | 740 | 100 | 1000 | 1000 | 1000 | 100 | 500 | 100 | 100 | 100 | 486 |
| PRESS. PSIA | 14 | 4300 | 4200 | 4300 | 4200 | 4200 | 4200 | 4300 | 4150 | 4100 | 50 | 50 | 600 |

Case 2

A 10 weight percent methanol solution enters the system at ambient temperature and is preheated to 538 degrees F. prior to entering a recycle reactor such as shown in FIG. 2. Table 4 shows the flow conditions at steady state operation at various locations A–M located throughout a system processing 10,000 pounds per hour of aqueous feed (locations A–M are shown in FIG. 2).

The feed stream enters the reactor at 4300 psia and 538 degrees F. Within the downflow leg, the temperature of the flowing stream reaches a temperature of 788 degrees F. by mixing 2 parts of the hot recycle stream at 1000 degrees F. with 1 part of fresh feed stream at 538 degrees F. The stream reaches 1000 degrees F. after oxygen injection and ignition. The recycle and effluent streams are also at 1000 degrees F. The reactor pressure is within a range of 4200 to 4300 psia. At the reactor outlet, the stream composition contains less than 0.01 percent of the organics entering in the process feed stream, with 99.99 percent having been oxidized to water and carbon dioxide. For materials harder to oxidize than methanol, a longer reactor could be used or, alternatively, a downstream plug-flow tubular reactor could be installed to provide extra retention time for the final stage of the oxidation.

The plant is heated to start-up temperatures using a fired heater 205. This heater 205 is sized for a continuous duty and is used to preheat the feed to 538 F. while the plant is in operation.

The recycle ratio used is 2 parts recycle per one part feed and is controlled by positioning the feed inlet tube at the proper height in the downflow leg.

The hot effluent gases from the reactor are cooled first by heat exchange to generate high pressure steam and then by indirect air or water cooling. The cooled stream flows through a pressure letdown valve to a liquid-vapor separator where the gases are separated from the liquid stream.

Case 4

This case is an alternate preferred method of operating the recycle reactor. The feed stream is rich in organic content so no preheating is required prior to the entrance of the feed stream into the downflow leg of the recycle reactor. Only about 95 percent of the stoichiometric amount of oxygen is fed to the recycle reactor and only about 95 percent of the organics in the feed are oxidized to water and carbon dioxide. This is done to keep the amount of oxygen in the recycle stream to a minimum. Oxygen in the recycle stream could cause preignition of the combustion reaction and destroy the density difference between the downflow and upflow legs which is the driving force in the recycle circuit. The hot effluent stream from the recycle reactor is fed directly to a plug flow reactor where additional oxygen is added and the remaining organics are oxidized.

In this case an 18.4 weight percent methanol aqueous solution enters the system at ambient temperature and without being preheated and flows to a recycle reactor such as shown in FIG. 3. Table 5 shows the flow conditions at steady state operation at various locations A–M located throughout a system processing 10,000 pounds per hour of aqueous feed (locations A–M are shown in FIG. 2).

The feed stream enters the recycle reactor at 4300 psia and ambient temperature. Within the downflow leg, the temperature of the flowing stream reaches a temperature of 736 degrees F. by mixing 2 parts of the hot recycle stream at 1000 degrees F. with 1 part of fresh feed stream at ambient temperature. The stream after oxygen injection and ignition reaches 1000 degrees F. The recycle and effluent streams are also at 1000 degrees F. The reactor pressure is within a range of 4200 to 4300 psia. At the reactor outlet, the stream composition contains about 5 percent of the organics entering in the process feed stream, with 95 percent having been oxidized to water and carbon dioxide. A downstream plug-flow tubular reactor is installed to provide extra retention time for the final stage of the oxidation.

TABLE 4

| | Feed Stream A | Feed to Recycle Reactor B | Recycle Reactor Downflow C | Oxygen to Recycle Reactor D | Recycle Reactor Upflow E | Reactor Recycle F | Recycle Reactor Effluent G | Oxygen to Plug Flow Reactor H | Effluent From Steam Boiler I | Cooler Effluent J | Vapor From L/V Separator K | Liquid From L/V Separator L | Steam Boiler M |
|---|---|---|---|---|---|---|---|---|---|---|---|---|---|
| METHANOL | 1000 | 1000 | 1000 | | | | | | | | | | |
| WATER | 9000 | 9000 | 26609 | | 27734 | 17609 | 10125 | | 10125 | 10125 | 40 | 10085 | 8430 |
| OXYGEN | | | | 1500 | | | | 67 | 67 | 67 | 67 | tr. | |
| CARBON DIOXIDE | | | 2391 | | 3766 | 2391 | 1375 | | 1375 | 1375 | 1340 | 35 | |
| TOTAL, LB/HR | 10000 | 10000 | 30000 | 1500 | 31500 | 20000 | 11500 | 67 | 11567 | 11567 | 1447 | 10120 | 8430 |
| TEMP, ° F. | 100 | 538 | 788 | 100 | 1000 | 1000 | 1000 | 100 | 500 | 100 | 100 | 100 | 486 |
| PRESS. PSIA | 14 | 4300 | 4200 | 4300 | 4200 | 4200 | 4200 | 4300 | 4150 | 4100 | 50 | 50 | 600 |

Case 3

A 7.5 weight percent methanol solution enters the system at ambient temperature and is preheated to 698 degrees F. prior to entering the recycle reactor as shown in FIG. 2.

The feed is so dilute in organics that it must be heated to near critical before entering the recycle reactor. At this temperature, it is above the ignition temperature. The recycle reactor which is used to heat the reactor feed to ignition temperature is not needed. Thus, the recycle reactor is bypassed and the feed stream goes directly to a plug flow reactor.

The plant is heated to start-up temperatures using a fired heater, 205, which is shut down once organics and oxygen are introduced and a flame front is established.

The recycle ratio used is 2 parts recycle per one part feed and is controlled by positioning the feed inlet tube at the proper point in the downflow leg. The size of the recycle reactor is 10 feet in vertical length, the downflow leg has a 4 inch inside diameter, and the upflow leg has a 10 inch inside diameter.

The hot effluent gases from the recycle reactor flow directly to the plug flow reactor. The hot gases from the plug flow reactor are cooled first by heat exchange to generate high pressure steam and then by indirect air or water cooling. The cooled stream flows through a pressure letdown valve to a liquid-vapor separator where the gases are separated from the liquid stream.

In Tables 3–5, unless otherwise indicated all entries are in pounds per hour.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims.

a bottom conduit connecting the bottom end of the first conduit to the bottom end of the second conduit;

an oxidant source connected to the recycle reactor such that oxidant is introduced during use from the source into the recycle reactor at a location downstream of the first conduit but upstream of the top conduit;

an effluent conduit connected to the recycle reactor downstream of the location that oxidant is introduced into the recycle reactor, the effluent conduit being connected to allow at least some of the reaction products stream to flow from the recycle reactor and into the effluent conduit during use;

wherein the recycle reactor is configured such that fluid flows during use from the first conduit to the bottom conduit, the bottom conduit to the second conduit, and the second conduit to the top conduit; and wherein at least a portion of the reaction products stream recycles during use from the top conduit to the first conduit, thereby mixing with and heating the input stream to form a mixture above the supercritical temperature for water, all without substantial heat exchange with an external source of heat, and wherein the recycle reactor is configured such that density differences between the inputted stream in the first conduit and the reaction products stream in

TABLE 5

| | Feed Stream A | Feed to Recycle Reactor B | Recycle Reactor Downflow C | Oxygen to Recycle Reactor D | Recycle Reactor Upflow E | Reactor Recycle F | Recycle Reactor Effluent G | Oxygen to Plug Flow Reactor H | Effluent From Steam Boiler I | Cooler Effluent J | Vapor From L/V Separator K | Liquid From L/V Separator L | Steam Boiler M |
|---|---|---|---|---|---|---|---|---|---|---|---|---|---|
| METHANOL | 1840 | 1840 | 1986 | | 238 | 146 | 92 | | | | | | |
| WATER | 8160 | 8160 | 24206 | | 26172 | 16046 | 10127 | | 10230 | 10230 | 50 | 10180 | 8145 |
| OXYGEN | | | 0 | 2622 | | 0 | 0 | 238 | 100 | 100 | 100 | tr. | |
| CARBON DIOXIDE | | | 3808 | | 6212 | 3808 | 2403 | | 2530 | 2530 | 2490 | 40 | |
| TOTAL, LB/HR | 10000 | 10000 | 30000 | 2622 | 32622 | 20000 | 12622 | | 12860 | 12860 | 2640 | 10220 | 8145 |
| TEMP, °F. | 61.8 | 61.8 | 736 | 100 | 1000 | 1000 | 1000 | 100 | 500 | 100 | 100 | 100 | 486 |
| PRESS. PSIA | 14 | 4300 | 4200 | 4300 | 4200 | 4200 | 4200 | 4300 | 4150 | 4100 | 50 | 50 | 610 |

What is claimed is:

1. A system for heating an input stream below the supercritical temperature for water to a temperature above the supercritical temperature of water, the system comprising;

a recycle reactor which is constructed to contain fluid at supercritical conditions for water during use, and which includes:

a first substantially vertically aligned conduit having a top end and a bottom end, the first conduit being connected to an input stream conduit such that the input stream is introduced into the first conduit from the input stream conduit during use; and a second substantially vertically aligned conduit having a top end and a bottom end, wherein the second conduit contains a reaction of oxidizable matter with an oxidant during use, the reaction producing a reaction products stream that is hotter and less dense than the input stream, and wherein the reaction products stream flows upwardly through the second conduit during use;

a top conduit connecting the top end of the first conduit to the top end of the second conduit; and the second conduit create a recycling stream driving force, and wherein the recycling stream driving force facilitates a recycling flow of the reaction products stream from the first conduit to the bottom conduit, from the bottom conduit to the second conduit, from the second conduit to the top conduit, and from the top conduit to the first conduit.

2. The system of claim 1, wherein the top conduit comprises a one way valve adapted to allow fluid to flow from the top conduit to the first conduit during use, and to prevent fluid flow from the first conduit to the top conduit during use.

3. The system of claim 1, wherein the recycling stream driving force is greater than stream friction losses in the recycle reactor.

4. The system of claim 1, further comprising an oxidizable matter conduit connected to the recycle reactor such that oxidizable matter is introduced during use into the recycle reactor.

5. The system of claim 1, wherein the input stream enters the recycle reactor at a temperature less than about 200° F. during use.

6. The system of claim 1, further comprising a controller adapted to vary the amount of reaction products stream recycled into the first conduit.

7. The system of claim 1 wherein the input stream comprises water and oxidizable matter.

8. The system of claim 1, further comprising a circulation device coupled to the recycle reactor and being adapted to enhance the recycle of the reaction products stream into the first conduit.

9. The system of claim 1, for comprising a pump coupled to the recycle reactor and being adapted to recycle at least a portion of the reaction products stream into the first conduit.

10. The system of claim 1, further comprising:
    a container adapted to hold an organic fluid; and
    a pump coupled to the container, wherein the pump is adapted to draw the organic fluid from the container, and then pump the fluid into the recycle reactor at a pressure above about 3200 psia.

11. The system of claim 1, further comprising a heater coupled to the input stream conduit, the heater being adapted to heat the input stream.

12. The system of claim 11, wherein the system further comprises a temperature measuring system coupled to the recycle reactor and coupled to the heater, wherein the temperature measuring system is adapted to measure a temperature of the reaction products stream, and wherein the heater is operable to adjust the input stream temperature responsive to the temperature of the reaction products stream.

13. The system of claim 12, wherein the heater is operable to maintain the temperature of the reaction products stream between about 705° F. and 1200° F.

14. The system of claim 11, further comprising an organic content monitor in the input stream, the organic content monitor being connected to measure the organic content of the input stream, and wherein the heater is further operable to adjust the input stream temperature as a function of the organic content of the input stream.

15. The system of claim 14, wherein the heater is operable to maintain the temperature of the reaction products stream between about 705° F. and 1200° F.

16. The system of claim 1, further comprising a feed conduit inserted a distance into the first conduit, wherein the recycle reactor receives the input stream through the feed conduit, and wherein the distance that the feed conduit is inserted into the first conduit is adjustable.

17. The system of claim 16, wherein the distance the feed conduit is inserted into the first conduit is adjustable to maintain the temperature of the reaction products stream between about 705° F. and 1200° F.

18. The system of claim 16, wherein the distance the feed conduit is inserted into the first conduit is adjustable to maintain the ratio of the reaction products stream mixed with the input stream at about 1 part input stream per about 1–6 parts of reaction products stream.

19. The system of claim 1, further comprising a feed conduit inserted into the first conduit such that during use the recycle reactor receives the input stream through the feed conduit, wherein the feed conduit has a cross-sectional area, and wherein the cross-sectional area of the feed conduit is adjustable.

20. The system of claim 19 wherein the cross-sectional area of the feed conduit is adjustable to maintain the temperature of the reaction products stream between about 705° F. and 1200° F.

21. The system of claim 19 wherein the cross-sectional area of the feed conduit is adjustable to maintain the ratio of the reaction products stream mixed with the input stream at about 1 part input stream per about 1–6 parts of reaction products stream.

22. The system of claim 19 wherein the cross-sectional area is adjustable by adjusting a valve in the feed conduit.

23. The system of claim 1, further comprising an oxidant controller adapted to control the rate that oxidant is introduced into the second conduit.

24. The system of claim 23 wherein the oxidant controller is adapted to control the oxidant rate such that the second conduit receives less than a stoichiometric amount of oxidant necessary to react with all of the oxidizable matter from the input stream.

25. The system of claim 23, further comprising a temperature measuring device coupled to the oxidant controller, wherein the temperature measuring device is adapted to measure the temperature of the reaction products stream, and wherein the oxidant controller is operable to change the flow rate of the oxidant into the second conduit as a function of the temperature of the reaction products stream.

26. The system of claim 1 wherein the ratio of the reaction products stream mixed with the input stream is about 1 part input stream per about 1–6 parts of reaction products stream.

27. The system of claim 1, further comprising a substantially plug-flow reactor coupled to the recycle reactor and connected to receive effluent containing reaction products from the recycle reactor, wherein the plug-flow reactor is adapted to oxidize oxidizable matter remaining in the effluent from the recycle reactor.

28. The system of claim 27, further comprising an oxidant source connected to introduce oxidant into the effluent from the recycle reactor.

29. The system of claim 27, further comprising an oxidant source connected to introduce oxidant into the plug-flow reactor.

30. The system of claim 27 wherein the recycle reactor is adapted to react up to 99% of total organic content of the input stream, and the plug-flow reactor is adapted to react at least 99.99% of total organic content of the input stream.

31. The system of claim 1 wherein the system is adapted to react up to 99% of total organic content of the input stream.

32. The system of claim 1 wherein the input stream is introduced into the recycle reactor near the top end of the first conduit, the oxygen is introduced into the recycle reactor near the bottom end of the second conduit, and the effluent flows from the recycle reactor near the top of the second conduit.

33. The system of claim 1 wherein the first conduit has a first cross-sectional area and the second conduit has a second cross-sectional area, the second cross-sectional area being greater than the first cross-sectional area.

34. The system of claim 1, further comprising a jet pump located within the first conduit.

35. The system of claim 1, further comprising an educator located within the first conduit.

36. A system for treating a input stream, the system comprising;
    a recycle reactor which includes:
        a first substantially vertically aligned conduit having a top end and a bottom end, the first conduit being connected to an input stream conduit such that the input stream is introduced into the first conduit from the input stream conduit during use; and
        a second substantially vertically aligned conduit having a top end and a bottom end, wherein the second conduit contains a reaction of oxidizable matter with an oxidant during use, the reaction producing a reaction products stream that is hotter and less dense than the input stream, and wherein the reaction products stream flows upwardly through the second conduit during use;

a top conduit connecting the top end of the first conduit to the top end of the second conduit; and a bottom conduit connecting the bottom end of the first conduit to the bottom end of the second conduit;

an oxidant source connected to the recycle reactor such that oxidant is introduced during use from the source into the recycle reactor at a location downstream of the first conduit but upstream of the top conduit;

an effluent conduit connected to the recycle reactor downstream of the location that oxidant is introduced into the recycle reactor, the effluent conduit being connected to allow at least some of the reaction products stream to flow from the recycle reactor and into the effluent conduit during use;

wherein the recycle reactor is configured such that fluid flows during use from the first conduit to the bottom conduit, the bottom conduit to the second conduit, and the second conduit to the top conduit, and wherein at least a portion of the reaction products stream recycles from the top conduit to the first conduit during use, thereby mixing with and heating the input stream, and wherein the first and second conduits are configured such that density differences between the inputted stream in the first conduit and the reaction products stream in the second conduit create a recycling stream driving force, and wherein the recycling stream driving force facilitates a recycling flow of the reaction products stream from the first conduit to the second conduit, and from the second conduit to the first conduit, and a substantially plug-flow reactor coupled to the recycle reactor and adapted to receive effluent containing reaction products from the recycle reactor, wherein the plug-flow reactor is adapted to oxidize oxidizable matter remaining in the effluent from the recycle reactor.

37. The system of claim 36, further comprising an oxidant source connected to introduce oxidant into the effluent from the recycle reactor.

38. The system of claim 36, further comprising an oxidant source connected to introduce oxidant into the plug-flow reactor.

39. The system of claim 36, wherein the recycle reactor is adapted to react up to 99% of total organic content of the input stream, and the plug-flow reactor is adapted to react at least 99.99% of total organic content of the input stream.

40. The system of claim 36, further comprising a conduit adapted to provide a cooling stream directly into the effluent from the recycle reactor at a location upstream of the plug flow reactor during use.

41. The system of claim 36, further comprising a conduit coupled to the effluent conduit adapted to transfer water into the effluent conduit during use, the water being at a temperature of below ambient temperature.

42. The system of claim 36, wherein the top conduit comprises a one way valve adapted to allow fluid to flow from the top conduit to the first conduit during use, and to prevent fluid flow from the first conduit to the top conduit during use.

43. The system of claim 36, wherein the recycling stream driving force is greater than stream friction losses in the recycle reactor.

44. The system of claim 36, further comprising an oxidizable matter conduit connected to the recycle reactor such that oxidizable matter is introduced during use into the recycle reactor.

45. The system of claim 36, wherein the input stream enters the recycle reactor at a temperature less than about 200° F. during use.

46. The system of claim 36, further comprising a controller adapted to vary the amount of reaction products stream recycled into the first conduit.

47. The system of claim 36 wherein the input stream comprises water and oxidizable matter.

48. The system of claim 36, further comprising a circulation device coupled to the recycle reactor and being adapted to enhance the recycle of the reaction products stream into the first conduit.

49. The system of claim 36, further comprising a pump coupled to the recycle reactor and being adapted to recycle at least a portion of the reaction products stream into the first conduit.

50. The system of claim 36, further comprising:

a container adapted to hold an organic fluid; and a pump coupled to the container, wherein the pump is adapted to draw the organic fluid from the container, and then pump the fluid into the recycle reactor at a pressure above about 3200 psia.

51. The system of claim 36, further comprising a heater coupled to the input stream conduit, the heater being adapted to heat the input stream.

52. The system of claim 51, wherein the system further comprises a temperature measuring system coupled to the recycle reactor and coupled to the heater, wherein the temperature measuring system is adapted to measure a temperature of the reaction products stream, and wherein the heater is operable to adjust the input stream temperature responsive to the temperature of the reaction products stream.

53. The system of claim 51, wherein the heater is operable to maintain the temperature of the reaction products stream between about 705° F. and 1200° F.

54. The system of claim 51, further comprising an organic content monitor in the input stream, the organic content monitor being connected to measure the organic content of the input stream, and wherein the heater is further operable to adjust the input stream temperature as a function of the organic content of the input stream.

55. The system of claim 54, wherein the heater is operable to maintain the temperature of the reaction products stream between about 705° F. and 1200° F.

56. The system of claim 36, comprising a feed conduit inserted a distance into the first conduit, wherein the recycle reactor receives the input stream through the feed conduit, and wherein the distance that the feed conduit is inserted into the first conduit is adjustable.

57. The system of claim 56, wherein the distance the feed conduit is inserted into the first conduit is adjustable to maintain the temperature of the reaction products stream between about 705° F. and 1200° F.

58. The system of claim 56, wherein the distance the feed conduit is inserted into the first conduit is adjustable to maintain the ratio of the reaction products stream mixed with the input stream at about 1 part input stream per about 1–6 parts of reaction products stream.

59. The system of claim 36, further comprising a feed conduit inserted into the first conduit such that during use the recycle reactor receives the input stream through the feed conduit, wherein the feed conduit has a cross-sectional area, and wherein the cross-sectional area of the feed conduit is adjustable.

60. The system of claim 59 wherein the cross-sectional area of the feed conduit is adjustable to maintain the temperature of the reaction products stream between about 705° F. and 1200° F.

61. The system of claim 59 wherein the cross-sectional area of the feed conduit is adjustable to maintain the ratio of the reaction products stream mixed with the input stream at about 1 part input stream per about 1–6 parts of reaction products stream.

62. The system of claim 59 wherein the cross-sectional area is adjustable by adjusting a valve in the feed conduit.

63. The system of claim 36, further comprising an oxidant controller adapted to control the rate that oxidant is introduced into the second conduit.

64. The system of claim 63 wherein the oxidant controller is adapted to control the oxidant rate such that the second conduit receives less than a stoichiometric amount of oxidant necessary to react with all of the oxidizable matter from the input stream.

65. The system of claim 63, further comprising a temperature measuring device coupled to the oxidant controller, wherein the temperature measuring device is adapted to measure the temperature of the reaction products stream, and wherein the oxidant controller is operable to change the flow rate of the oxidant into the second conduit as a function of the temperature of the reaction products stream.

66. The system of claim 36 wherein the ratio of the reaction products stream mixed with the input stream is about 1 part input stream per about 1–6 parts of reaction products stream.

67. The system of claim 36 wherein the input stream is introduced into the recycle reactor near the top end of the first conduit, the oxygen is introduced into the recycle reactor near the bottom end of the second conduit, and the effluent flows from the recycle reactor near the top of the second conduit.

68. The system of claim 36 wherein the first conduit has a first cross-sectional area and the second conduit has a second cross-sectional area, the second cross-sectional area being greater than the first cross-sectional area.

69. The system of claim 36, further comprising a jet pump located within the first conduit.

70. The system of claim 36, further comprising an educator located within the first conduit.

71. A recycle reactor system for oxidizing organic waste at a supercritical temperature of water comprising a continuous reaction loop, wherein the loop comprises an essentially vertically oriented reaction loop, configured to produce an upward flow of reaction products in a first part of the loop and a downward flow of unreacted organic waste in a second part of the loop, an organic waste conduit, a reaction products effluent conduit, an oxidant input conduit, and a means for maintaining the reaction during use at a supercritical temperature for water without the use of an external heat source, wherein the first part of the loop and the second part of the loop are configured such that density differences between the unreacted organic waste in the second part of the loop and the reaction products in the first part of the loop create a recycling stream driving force, and wherein the recycling stream driving force facilitates a recycling flow of the reaction products stream within the reaction loop.

72. The system of claim 71, wherein the system is effective to maintain the reaction temperature by controlling the recycle ratio during use.

73. The system of claim 72, wherein the system is effective to control the recycle ratio by diverting a controlled proportion of the reaction products stream into the effluent conduit during use.

74. The system of claim 73, wherein the proportion of the reaction products diverted is controlled by varying the circumference of the effluent conduit.

75. The system of claim 73, wherein the diversion of a controlled proportion of the reaction products, stream into the effluent conduit during use is controlled by a valve or an orifice.

76. The system of claim 72, wherein the system is effective to control the recycle ratio by varying the location of input of the organic waste conduit in the loop during use.

77. The system of claim 72, wherein the system is effective to control the recycle ratio by varying the amount of oxidant input during use.

78. The system of claim 72, wherein the system is effective to control the recycle ratio by varying the amount of organic waste input during use.

79. The system of claim 78, wherein the amount of organic waste input is varied by varying the circumference of the input conduit.

80. The system of claim 71, further comprising a means for pre-heating an input stream of organic waste.

81. The system of claim 71, further comprising a circulation device effective to enhance the recycle flow within the device during use.

82. The system of claim 81, wherein the circulation device is a jet pump.

83. The system of claim 71, wherein the oxidant conduit is positioned downstream of the organic waste input conduit and the reaction products effluent conduit is positioned downstream of the oxidant input conduit.

84. The system of claim 71, further defined as comprising a one way valve, effective to allow fluid flow in one direction in the loop during use, and to prevent fluid flow in the opposite direction.

85. The system of claim 71, further comprising a container for organic waste in fluid communication with the organic waste input conduit.

86. The system of claim 85, further comprising a pump effective to pump fluid from the container into the organic waste input conduit.

87. The system of clam 86, wherein the pump is effective to pump the organic waste into the loop at a pressure of above about 3200 psia.

88. The system of claim 71, further comprising an oxidant source connected to the oxidant conduit.

89. The system of claim 88, wherein the oxidant source is a source of ozone, oxygen, hydrogen peroxide, air, nitric acid, perchlorates or permanganates.

90. The system of claim 71, further defined as comprising one or more temperature measuring devices.

91. The system of claim 71, further comprising a valve in the second part of the loop for controlling the rate of recycle flow.

92. The system of claim 71, further comprising a plug-flow reactor connected to the reaction products effluent conduit.

* * * * *

UNITED STATES PATENT AND TRADEMARK OFFICE
CERTIFICATE OF CORRECTION

PATENT NO. : 6,001,243
DATED : December 14, 1999
INVENTOR(S) : James M. Eller, et. al.

It is certified that error appears in the above-indentified patent and that said Letters Patent is hereby corrected as shown below:

Claim 35, col. 22, line 52, please delete "educator" and substitute therefor --eductor--.
Claim 70, col. 25, lines 41 and 42, please delete "educator" and substitute therefor --eductor--.
Claim 75, col. 26, line 9, please delete the "," after the word products.

Signed and Sealed this

Thirteenth Day of March, 2001

*Attest:*

NICHOLAS P. GODICI

*Attesting Officer*  *Acting Director of the United States Patent and Trademark Office*